United States Patent
Naugle, Jr. et al.

(10) Patent No.: US 11,627,547 B1
(45) Date of Patent: Apr. 11, 2023

(54) DATA-DRIVEN ENCAMPMENT MANAGEMENT SYSTEMS AND METHODS

(71) Applicant: REV LLC, Lakewood, WA (US)

(72) Inventors: Robert K Naugle, Jr., Lakewood, WA (US); Traci A Curry, Mercer Island, WA (US); Robert A Walker, II, Sedro Woolley, WA (US)

(73) Assignee: REV LLC, Lakewood, WA (US)

( * ) Notice: Subject to any disclaimer, the term of this patent is extended or adjusted under 35 U.S.C. 154(b) by 0 days.

(21) Appl. No.: 17/834,336

(22) Filed: Jun. 7, 2022

(51) Int. Cl.
| | |
|---|---|
| *H04W 64/00* | (2009.01) |
| *G06K 9/62* | (2022.01) |
| *H04W 24/02* | (2009.01) |
| *H04W 4/02* | (2018.01) |

(52) U.S. Cl.
CPC .......... *H04W 64/00* (2013.01); *G06K 9/6256* (2013.01); *H04W 4/02* (2013.01); *H04W 24/02* (2013.01)

(58) Field of Classification Search
CPC ....... H04W 64/00; H04W 4/02; H04W 24/02; H04W 12/66; H04W 12/65; H04W 4/30; H04W 4/33; H04W 40/24; H04W 40/246; H04W 40/248; H04W 40/18; H04W 40/20; H04W 60/04; H04W 4/021; H04W 4/029; H04W 64/003; H04W 16/22; H04W 16/18; H04W 24/00; H04W 92/18; H04W 88/18; H04W 88/02; G06F 30/27; G06V 10/70; G06V 10/88; G06K 9/62; G06K 9/6256; G06K 9/6262; G06N 20/00; G06N 20/10; G06N 20/20; G05B 13/00; G16H 80/00; G16H 50/00; G16H 50/80; G16H 50/20; G16H 15/00
See application file for complete search history.

(56) References Cited

U.S. PATENT DOCUMENTS

| | | |
|---|---|---|
| 10,296,961 B2 | 5/2019 | Kirkby et al. |
| 10,332,385 B2 | 6/2019 | Knechtel et al. |
| 10,360,443 B2 | 7/2019 | Lee et al. |
| 10,424,029 B2 | 9/2019 | Singh et al. |
| 10,635,720 B1 | 4/2020 | Luo et al. |
| 10,643,224 B2 | 5/2020 | Bhuyan et al. |

(Continued)

FOREIGN PATENT DOCUMENTS

| | | | | |
|---|---|---|---|---|
| CN | 207728088 U | * | 8/2018 | ............ Y02E 10/50 |
| KR | 1801767 B1 | * | 12/2017 | ......... G06F 3/04817 |
| WO | WO 2021036150 A1 | * | 3/2021 | ............ G06Q 50/26 |

OTHER PUBLICATIONS

Xiang et al; A Campus Epidemic Monitoring Method, Device, Computer Device and Storage Medium; filed on filed on Dec. 9, 2020 and published Mar. 19, 2021 in CN. (Year: 2021).*

*Primary Examiner* — Meless N Zewdu
(74) *Attorney, Agent, or Firm* — AEON Law, PLLC; Adam L. K. Philipp; Jonathan E. Olson

(57) ABSTRACT

Data-driven systems and methods are described in regard to managing an encampment of at-risk individuals. In some variants a client/mobile device is configured according to one or more special-purpose protocols by which a task pertaining to the encampment is associated with a first resource, wherein the first task includes obtaining a first informational component. Recommendation data pertaining to the encampment is provided that is correlated with one or more features of the encampment and includes a task or referral pertaining to a second resource.

24 Claims, 10 Drawing Sheets

(56) References Cited

U.S. PATENT DOCUMENTS

| | | | |
|---|---|---|---|
| 10,706,057 | B2 | 7/2020 | Connolly et al. |
| 10,991,461 | B2 | 4/2021 | Divine et al. |
| 10,997,613 | B2 | 5/2021 | Leung et al. |
| 11,049,598 | B2 | 6/2021 | Weng |
| 11,068,385 | B2 | 7/2021 | Ahamed |
| 11,073,404 | B2 | 7/2021 | Fletcher |
| 11,093,979 | B2 | 8/2021 | Strutton et al. |
| 11,134,845 | B2 | 10/2021 | Nyquist |
| 11,157,930 | B1 | 10/2021 | Bachu et al. |
| 11,195,057 | B2 | 12/2021 | Zadeh et al. |
| 11,269,891 | B2 | 3/2022 | Frank et al. |
| 11,295,251 | B2 | 4/2022 | Chang et al. |
| 2004/0122701 | A1* | 6/2004 | Dahlin et al. ................ 705/2 |
| 2006/0085227 | A1* | 4/2006 | Rosenfeld et al. ............ 705/2 |
| 2015/0156567 | A1* | 6/2015 | Oliver et al. ............ H04Q 9/00 |
| 2016/0055499 | A1* | 2/2016 | Hawkins et al. .. G06Q 30/0204 |
| 2020/0077250 | A1* | 3/2020 | Gideon, III ............ H04W 4/90 |
| 2021/0084608 | A1* | 3/2021 | Cui et al. ............ H04W 64/003 |
| 2021/0350897 | A1* | 11/2021 | Shelton et al. ........ G16H 20/17 |
| 2022/0139550 | A1* | 5/2022 | Zhao et al. ............ G16H 40/67 |
| 2022/0189627 | A1* | 6/2022 | Kim ...................... G16H 40/67 |

\* cited by examiner

DATA-DRIVEN ENCAMPMENT MANAGEMENT SYSTEMS AND METHODS

DETAILED DESCRIPTION

Figure 1:
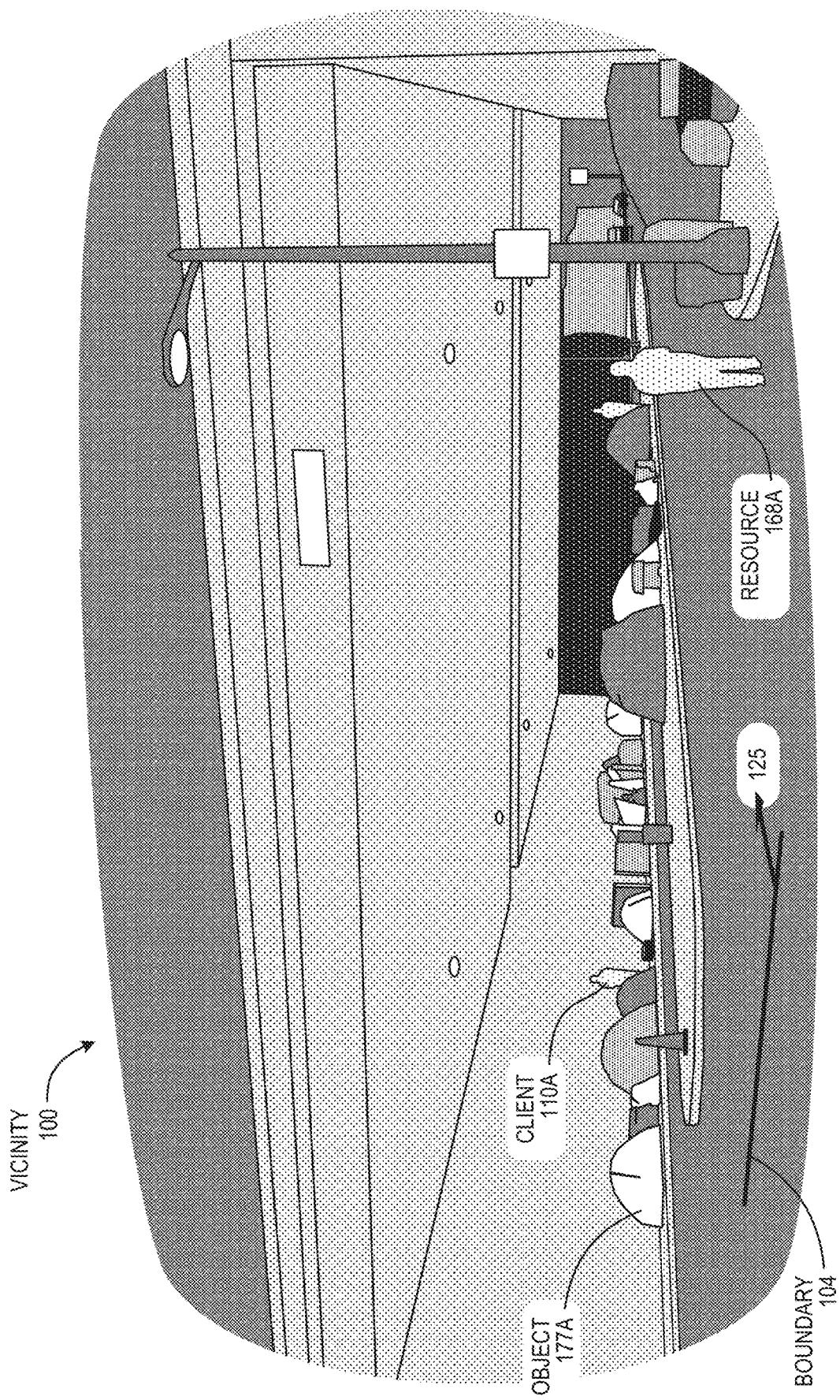
FIG. 1 depicts a vicinity of an encampment in which at-risk individuals are taking shelter according to one or more improved technologies.

The detailed description that follows is represented largely in terms of processes and symbolic representations of operations by conventional computer components, including a processor, memory storage devices for the processor, connected display devices, and input devices. Furthermore, some of these processes and operations may utilize conventional computer components in a heterogeneous distributed computing environment, including remote file servers, computer servers, and memory storage devices.

The terminology used in the description presented below is intended to be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous unless the context dictates otherwise.

"Any," "application-specific," "associated," "based on," "caused," comprising," "conditional," "configured," "correlated," "current," "delayed," "first," "how many," "impaired," "indicative," "informational," "learning," "local," "machine learning," "mobile," "more," "online," "over," "partly," "pertaining," "prescribed," "prioritized," "progressive," "pursuant," "quantified," "recommended," "related," "restored," "selectively," "soon," "special-purpose," "successful," "suitable," "through," "transistor-based," "undue," "unobtrusive," "updated," "upon," "utility," "very," "via," "wherein," "wireless," "within," "without," or other such descriptors herein are used in their normal yes-or-no sense, not merely as terms of degree, unless context dictates otherwise. Although one of these types of instruction sets may invoke the other as a subroutine, only very rarely is a single code component of instructions a true hybrid. As used herein a computer response to a user action is not "automatic" if the response merely implements the user action. But computer responses to a user action may be "automatic" if the user-intended event ultimately triggers the computer response in a complex cascading or combinational way that few users could foresee without access to advanced technologies disclosed herein. Two numbers are "within an order of magnitude" or "on the order of" one another if they differ by a factor of ten or less.

In light of the present disclosure those skilled in the art will understand from context what is meant by "remote" and by other such positional descriptors used herein. Likewise they will understand what is meant by "partly based" or other such descriptions of dependent computational variables/signals. A set of items is "numerous" if at least two dozen items are included. A set of items is "very numerous" if at least two hundred items are included. A responsive event is a "real time" result if a last defined trigger thereof (e.g. a user action or other programmatically detected condition) occurred less than 30 seconds before the real-time responsive result. As used herein one or more physical locations "correspond" with a map, prioritization, development, presentation, or condition thereof if the former refers to the latter, if the latter refers to the former, or if one or more digital objects (e.g. records) establish a linkage between the two. Such correspondence may or may not be one-to-one in respective variants. A "prioritization" is a distinguishing indication tending to cause one or more options to become more favorable relative to one or more other options such as by demoting or disqualifying the other option(s). An item is "within" a range as used herein if it is not outside the range.

As used herein items that are "particular" or "subject" or "associated" are distinct from other items not so described in a given scenario. These are not otherwise imbued with substantive weight herein, unlike such terms as "primary" or "higher." The term "other" and ordinal identifiers like "first" are likewise used to distinguish items from other items, not for signaling a temporal or other substantive sequence.

Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

FIG. 1 depicts a vicinity 100 of an encampment in which at-risk individuals are taking shelter according to one or more improved technologies. Also shown are several objects 177A and some clients 110A within the encampment; one or more onsite resources 168A (e.g. volunteers); and a boundary 104 of a zone 125 associated with the encampment. As used herein an "encampment" refers to an assembly of tents, vehicles, or other objects 177 (e.g. tents, tarps, newspapers, or bedrolls) used by at-risk clients for temporary shelter.

As used herein, a plain integer (e.g. like 123) may refer generally to a member of a class of items (e.g. like computing devices or vehicles) exemplified with a hybrid numeral (e.g. like 123A) and it will be understood that every item identified with a hybrid numeral is also an exemplar of the class. Moreover although a reference numeral shared between figures refers to the same item, most figures depict respective embodiments.

Figure 2:
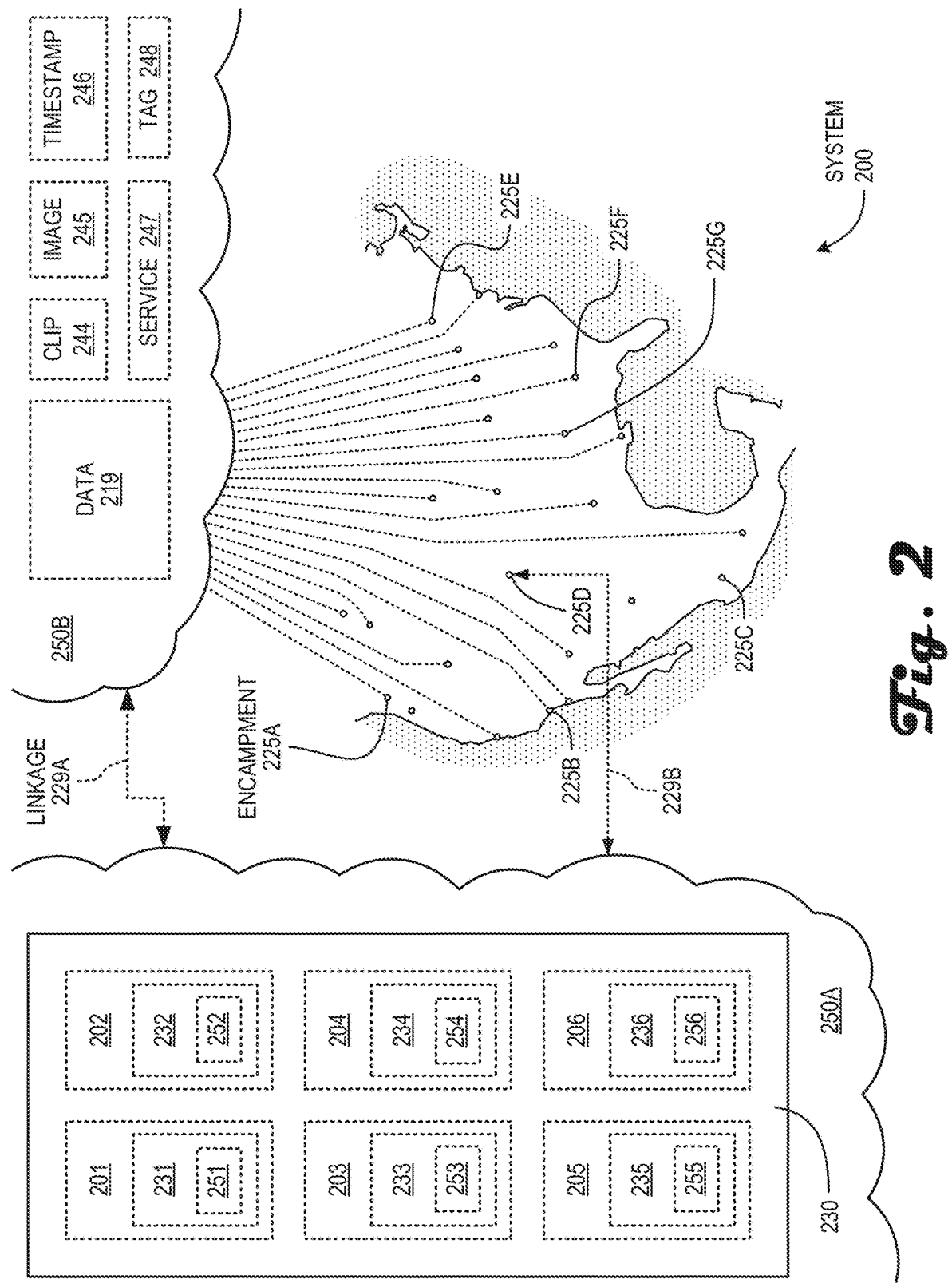
FIG. 2 depicts a system in which variously-managed encampments in which one or more improved technologies may be incorporated across North America so as to benefit from each other's experience in a systematic fashion.

FIG. 2 depicts a system 200 in which one or more encampments 225 in many major urban areas may effectively collaborate so as to benefit from each other's experience in a systematic fashion. As shown a first network 250A is operably coupled with a second network 250B via a first linkage 229A and operably coupled with one or more resources at one or more encampments 225D (in a vicinity 100 of Denver as shown) via one or more other linkages 229B.

Within the first network 250A is shown various special-purpose transistor-based circuitry 230—optionally implemented as an application specific integrated circuit (ASIC) or in a user interface (UI) governance server, for example— in which some or all of the functional modules described herein may be implemented. Transistor-based circuitry 230 includes one or more instances of various modules 201-206 as further described below. Control modules 201, for example, each including an electrical node set 231 upon which informational data is represented digitally as a corresponding voltage configuration 251. Alternatively or additionally, transistor-based circuitry 230 may include one or more instances of download modules 202 each including an electrical node set 232 upon which informational data is represented digitally as a corresponding voltage configuration 252. Transistor-based circuitry 230 may likewise include instances of response modules 203 each including an electrical node set 233 upon which informational data is represented digitally as a corresponding voltage configuration 253. Transistor-based circuitry 230 may likewise include instances of selection modules 204 each including an electrical node set 234 upon which informational data is represented digitally as a corresponding voltage configuration 254. Transistor-based circuitry 230 may likewise include instances of learning modules 205 each including an electrical node set 235 upon which informational data is represented digitally as a corresponding voltage configuration 255. Transistor-based circuitry 230 may likewise include instances of interface modules 206 each including an electrical node set 236 upon which informational data is represented digitally as a corresponding voltage configuration 256. In some variants, as described below, such modules implement such functionality jointly (e.g. in conjunction with other modules or processors described herein). Alternatively or additionally, in some variants such modules (or components thereof) may be geographically distributed across one or more networks 250A-B.

As shown such network 250B may have monitored or otherwise pertained to one or more encampments 225A at Seattle; one or more encampments 225B at Los Angeles; one or more encampments 225C at Guadalajara; one or more encampments 225D at Denver; one or more encampments 225E at Ottawa; one or encampments 225F at Atlanta; or one or more encampments 225G at Memphis. As shown historical data 219 pertaining to these encampments may comprise numerous clips 244, images 245, (records of) services 247, and other features. Many of these each contain or are otherwise associated with one or more timestamps 246 or metadata tags 248 (or both), with varying and debatable degrees of effectiveness. But within data 219 from these sources, past and present, are great insights into what is and is not effective for the purposes of various stakeholders interested in encampment management. Moreover such data may not only serve as training data but also as testing or validation data for a model under development, as further described below in regard to encampment 225D.

Figure 3:
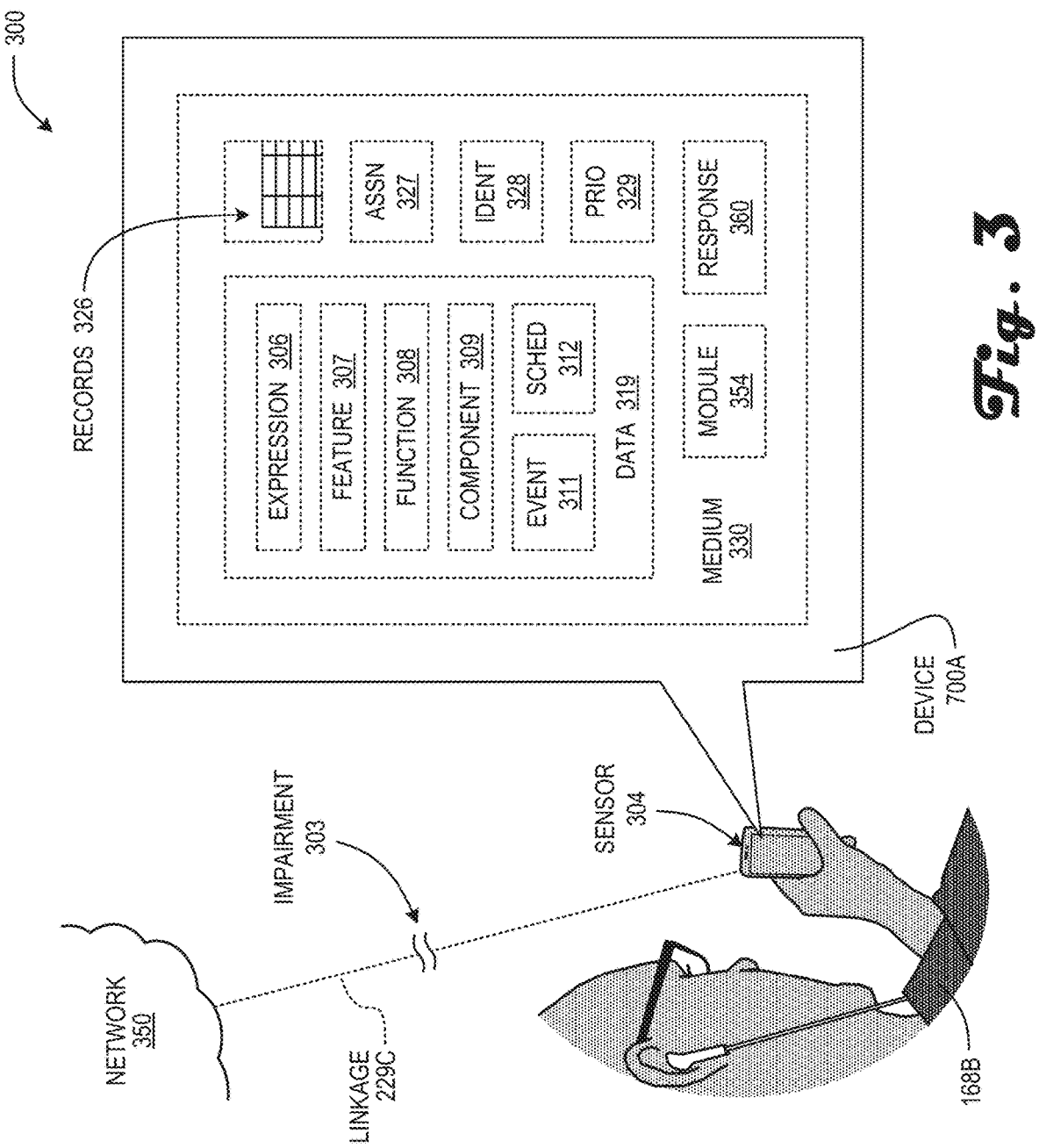
FIG. 3 depicts a mobile/computing device suffering intermittent connectivity in which one or more improved technologies may be incorporated.

FIG. 3 depicts a system 300 in which a network 350 is intermittently coupled (via a wireless linkage 229C) with a mobile/computing device 700A, sometimes suffering an impairment 303. Network 350 may, moreover, include or otherwise access one or more other networks 250A-B described herein. Nevertheless one or more apps aboard device 700A allow a worker, volunteer, or other resource 268 to obtain one or more interview answers, authorizations, samples, or other (items that manifest a fulfillment of) recommendations 919 while offline. In some variants such apps may be authorized to use one or more cameras, microphones, or other sensors 304 aboard device 700A to present or capture one or more instances of expressions 306 of opinion or need, of features 307, of functions 308, of requested items, or of other protocol- or task-related data 319 as described herein via local media 330. Alternatively or additionally such actionable data components 309 may specify or demonstrate one or more instances of events 311 or schedules 312 thereof; of records 326 or other associations 327 thereof; of identifications 328 or prioritizations 329 thereof; or of digital modules 354 or recommendation-specific responses 360 as further described below.

Figure 4:
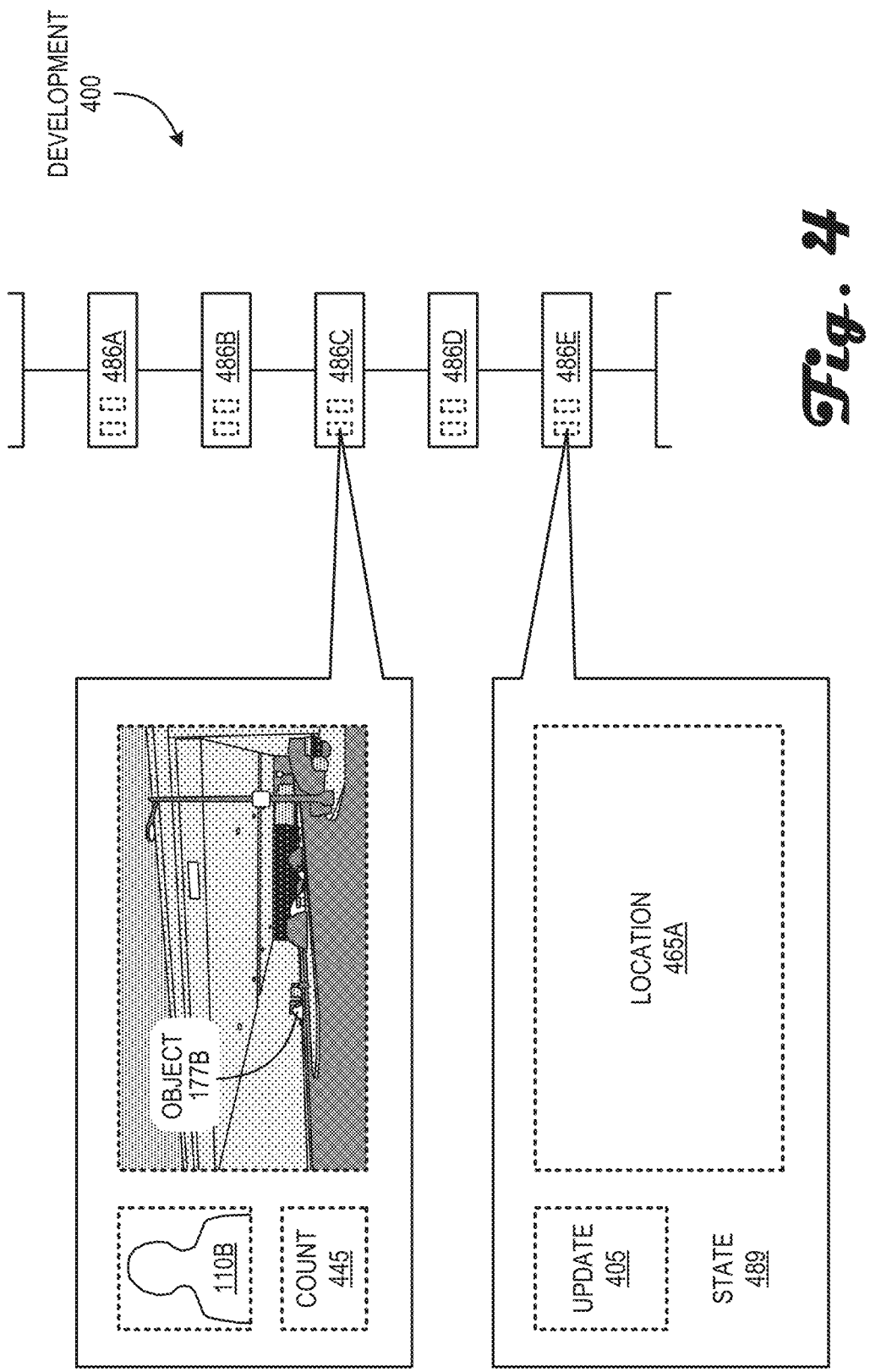
FIG. 4 depicts a progression through several stages of development in which one or more improved technologies may be incorporated.

FIG. 4 depicts a progression through several stages of development 400 in which one or more improved technologies may be incorporated. In one or more "early" encounters 486A-C, for example, a "before" state of a client 110B, count 445 (e.g. of events or objects 117B matching a pattern), or of (at least part of) a location 465A can be seen. In one or more "late" encounters 486D-E as shown, an "after" state 489 of the same client 110B, (type of) count 445, or location 465A may often be used (e.g. by a human observer or object recognition module) to ascertain how much development 400 has occurred and whether the change is progressive as a scoring function to evaluate success.

Figure 5:
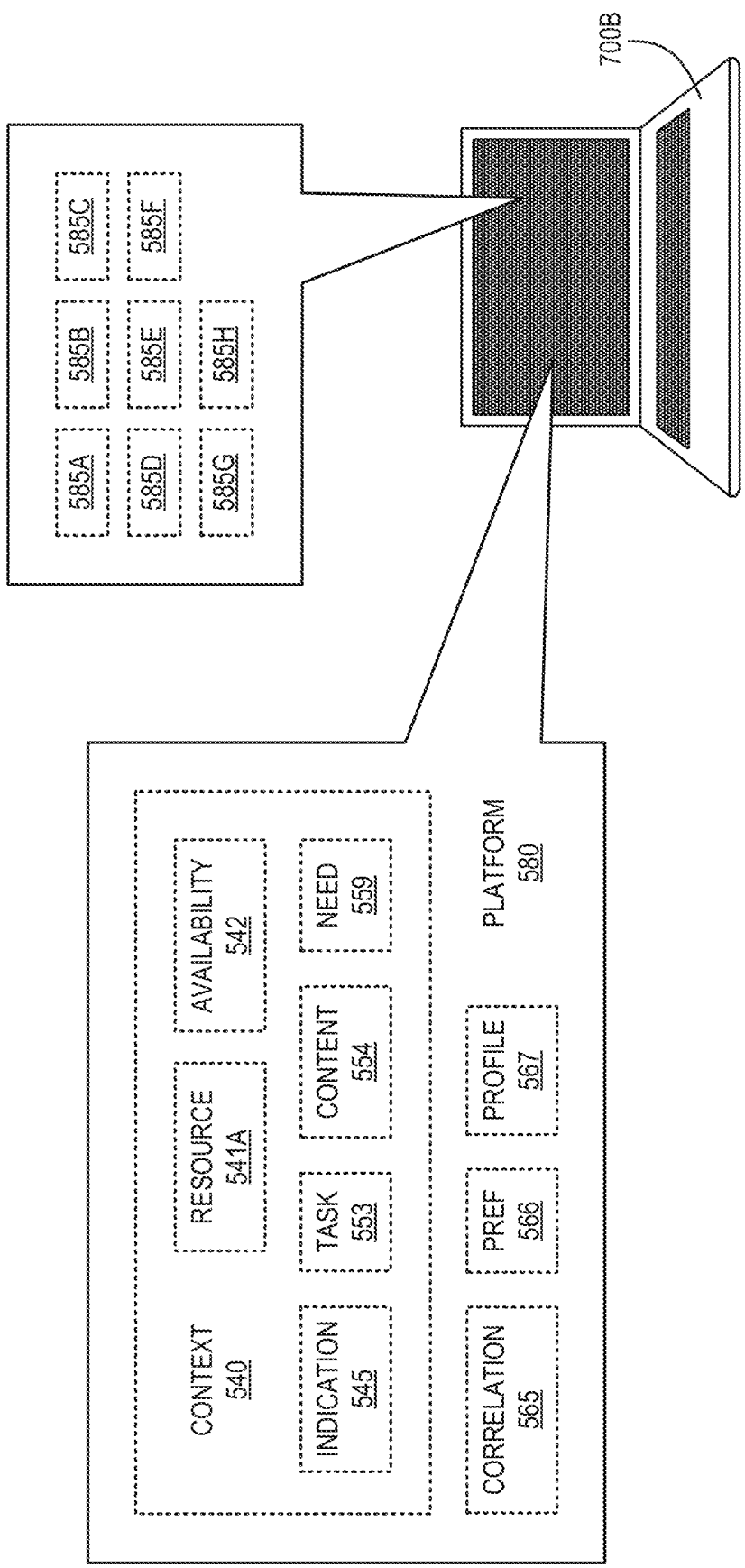
FIG. 5 depicts a peer/mobile/computing device that may incorporate one or more improved technologies.

Referring now to FIG. 5, there is shown a portable device 700B in which one or more technologies may be implemented. Device 700B as shown, optionally connected to one or more networks 250, 350 or servers described herein, provides a platform in which a user may review one or more instances of resources 541A, availabilities 542, of indications 545, of tasks 553, of content 554, of needs 559, or of other aspects of context 540 as described herein. Alternatively or additionally device 700B may handle one or more instances of developments 400 or other histories 563; of preferences or profiles 567; or of protocols 585 described herein. These may include one or more diagnostic protocols 585A, recommendation protocols 585B, testing protocols 585C, intake protocols 585D, acquisition protocols 585E, monitoring protocols 585F, scoring or other evaluation protocols 585G, data capture protocols 585H, or other protocols 585 described herein.

Figure 6:
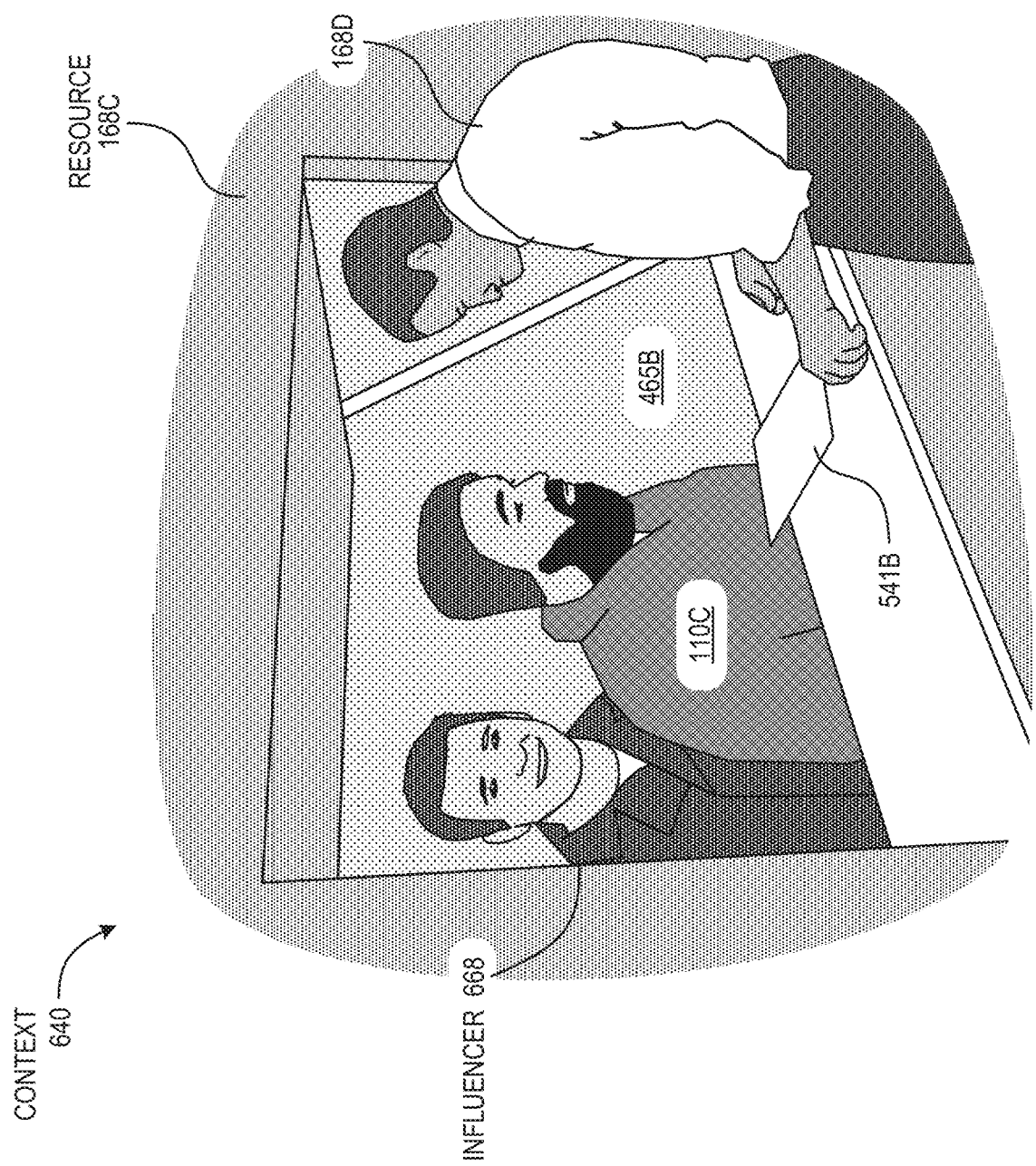
FIG. 6 depicts a client engagement location in which one or more resources provide service and in which one or more improved technologies may be incorporated.

Referring now to FIG. 6, there is shown a client 110C, influencer 668, and two other resources 168C-D engaged in a service location 465B in or near an encampment 225. In some contexts 640 described herein such engagements may include at-risk-client intake or other encampment-related protocols, such as dispensing information as well as food or other tangible resources 541B.

In some contexts a method herein comprises causing a first computing device 700 to be configured according to one or more special-purpose protocols 585 by which recommendation data 319 (e.g., establishing some or all components of a recommendation) is obtained that comprises a first human or other resource 168 performing a first task 553 that comprises obtaining one or more primary informational components 309 pertaining to (one or more categorizations, geographic locations 465, residents, safety levels, or other therapeutically significant features 307 of) the first encampment 225. This can occur, for example, in a context in which the one or more primary informational components 309 have a higher (range or level of) prioritization 329 than that of at least one secondary informational component 309 that is also available; in which one or more interface modules 206 are configured to signal (one or more invitations to, details about, or other features pertaining to) a first interactive event 311 selectively among or otherwise between a second resource 168 and the first encampment 225 partly based on a first correlation 565 between the second resource 168 and a particular one of the primary informational component(s) 309 and partly based on one or more success-indicative performance metrics described herein that pertain to that particular informational component 309; and in which such a useful and necessary interactive event 311 would not otherwise occur in time to help a particular client 110 taking shelter in the first encampment 225. As used herein, variables are "correlated" if outlying empirical data points thereof are close and infrequent enough (e.g., to a monotonic staircase function or the like) that they have a Pearson product-moment correlation coefficient with a magnitude greater than 0.6 unless context dictates otherwise. See U.S. Pat. No. 10,565,386 ("Security systems and methods based on cryptographic utility token inventory tenure"). As used herein, an output variable is "based" or "dependent" on one or more others (e.g., in a table lookup or similar functional dependence defined by an expert or expert system) if the one or more others can each affect the output variable in at least one context.

Figure 7:
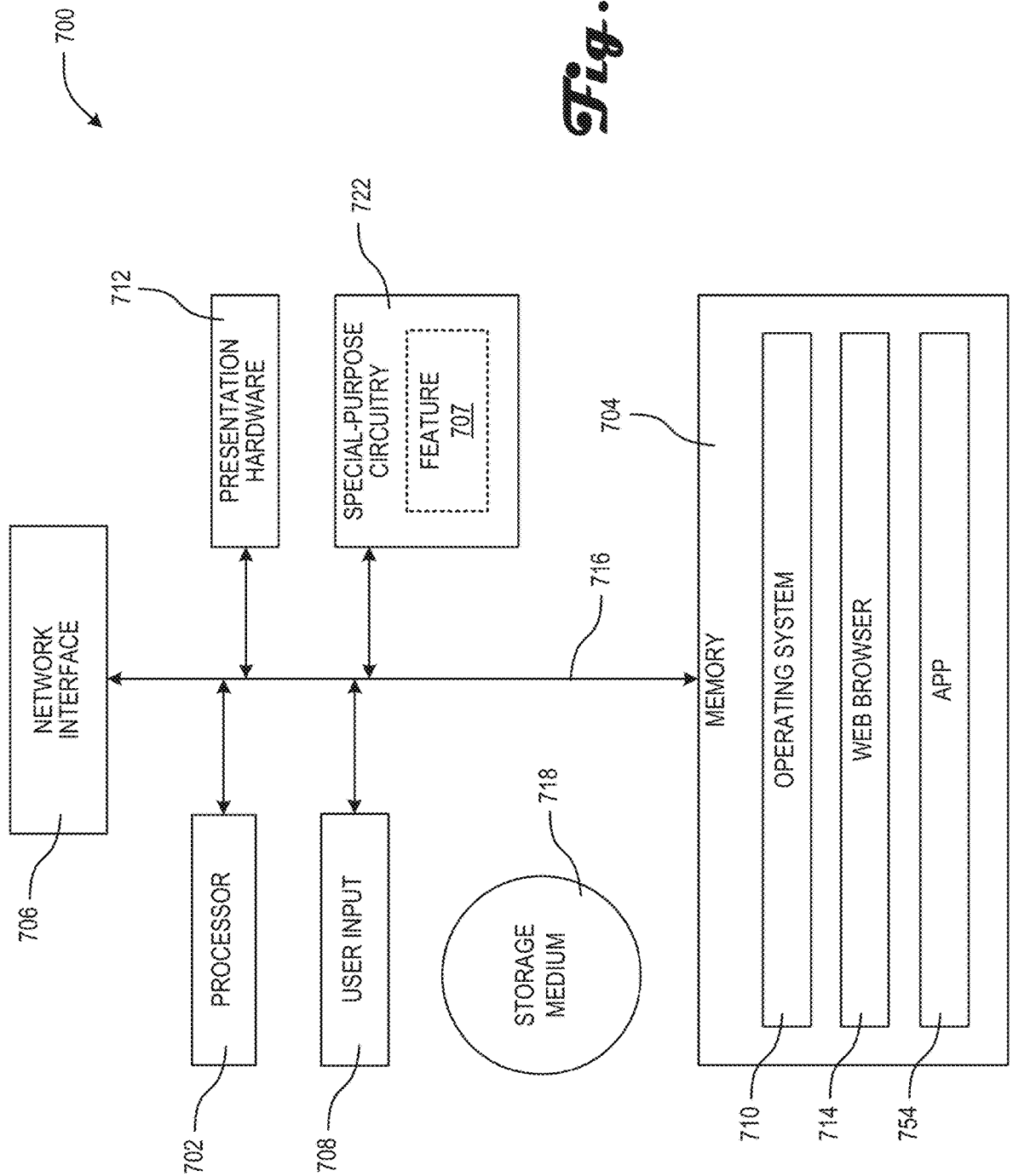
FIG. 7 depicts a peer/mobile/computing device in which one or more improved technologies may be incorporated.

Referring now to FIG. 7, there is shown a mobile or other computing device 700 in which one or more technologies may be implemented. Device 700 may include one or more instances of processors 702, of memory 704, of user inputs 708, and of display screens or other presentation hardware 712 all interconnected along with the network interface 706 via a bus 716. One or more network interfaces 706 allow device 700 to connect via the Internet or other networks 250, 350 to or within corporate or other human entities. Memory 704 generally comprises a random access memory ("RAM"), a read only memory ("ROM"), and a permanent mass storage device, such as a disk drive.

Memory 704 may contain one or more instances of operating systems 710, web browsers 714, and local apps 754. These and other software components may be loaded from a non-transitory computer readable storage medium 718 into memory 704 of the computing device 700 using a drive mechanism (not shown) associated with a non-transitory computer readable storage medium 718, such as a floppy disc, tape, DVD/CD-ROM drive, flash card, memory card, or the like. In some embodiments, software components may also be loaded via the network interface 706, rather than via a computer readable storage medium 718. Special-purpose circuitry 722 may, in some variants, include some or all of the event-sequencing logic described herein as transistor-based circuitry 330 (e.g. in a peer-to-peer implementation) and one or more security features 707 (e.g. a fob or similar cryptographic security apparatus).

In some contexts, a security feature 707 may implement or otherwise interact with removable or other digital wallets. Such wallets may (optionally) each include one or more instances of private keys, of utility tokens, of crypto currency, of provenance data, or of device-executable code snippets (e.g. smart contracts) configured to perform one or more functions as described below. In some embodiments device 700 may include many more components than those shown in FIG. 7, but it is not necessary that all conventional components be shown in order to disclose an illustrative embodiment.

Figure 8:
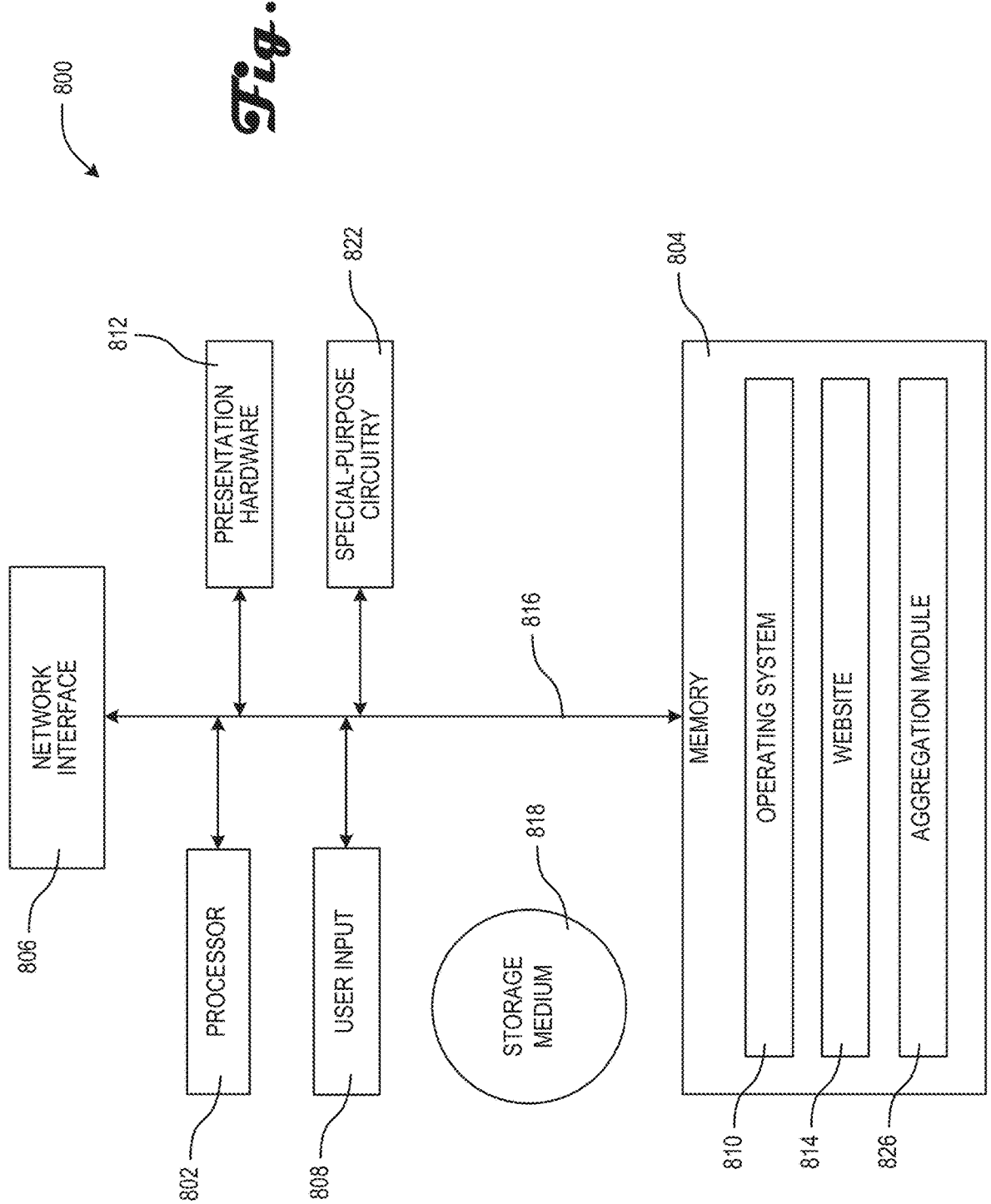
FIG. 8 depicts a server in which one or more improved technologies may be incorporated.

Referring now to FIG. 8, there is shown an exemplary server 800 one or more of which may likewise be configured to perform functions as described below. Server 800 may include one or more instances of processors 802, of memory 804, of user inputs 808, and of display screens or other presentation hardware 812 all interconnected along with the network interface 806 via a bus 816. One or more network interfaces 806 allow server 800 to connect via the Internet or other networks 250, 350 to or within entities as described below). Memory 804 generally comprises a random access memory ("RAM"), a read only memory ("ROM"), and a permanent mass storage device, such as a disk drive.

Memory 804 may contain one or more instances of operating systems 810, hosted websites 814, and aggregation modules 826. These and other software components may be loaded from a non-transitory computer readable storage medium 818 into memory 804 of the server 800 using a drive mechanism (not shown) associated with a non-transitory computer readable storage medium 818, such as a floppy disc, tape, DVD/CD-ROM drive, flash card, memory card, or the like. In some embodiments, software components may also be loaded via the network interface 806, rather than via a computer readable storage medium 818. Special-purpose circuitry 822 may, in some variants, include some or all of the event-sequencing logic described with reference to FIG. 2 (e.g. in a neural network implementation) and one or more security features (e.g. a firewall), not shown. In some embodiments server 800 may include many more components than those shown in FIG. 8, but it is not necessary that all conventional components be shown in order to disclose an illustrative embodiment.

In light of teachings herein, numerous existing techniques may be applied for implementing pattern matching, modeling, scoring, selection, correlation, client identification and intake, routing, prioritization, and other data distillation protocols as described herein without undue experimentation. See, e.g., U.S. patent Ser. No. 11/295,251 ("Intelligent opportunity recommendation"); U.S. patent Ser. No. 11/269, 891 ("Crowd-based scores for experiences from measurements of affective response"); U.S. patent Ser. No. 11/195, 057 ("System and method for extremely efficient image and pattern recognition and artificial intelligence platform"); U.S. patent Ser. No. 11/157,930 ("Systems and methods for defining candidate and target locations based on items and user attributes"); U.S. patent Ser. No. 11/134,845 ("Location based patient monitoring"); U.S. patent Ser. No. 11/093,979 ("Machine learning system for configuring social media campaigns"); U.S. patent Ser. No. 11/073,404 ("Systems and methods for providing mobile mapping services including trip prediction and route recommendation"); U.S. patent Ser. No. 11/068,385 ("Behavior driven development test framework for application programming interfaces and webservices"); U.S. patent Ser. No. 11/049,598 ("Robust health tracking service"); U.S. patent Ser. No. 10/997,613 ("Cross-channel recommendation processing"); U.S. patent Ser. No. 10/991,461 ("Assessing the current state of a physical area of a healthcare facility using image analysis"); U.S. patent Ser. No. 10/706,057 ("Presenting groups of content item selected for a social networking system user based on content item characteristics"); U.S. patent Ser. No. 10/643,224 ("Analyzing event-associated connections"); U.S. patent Ser. No. 10/635,720 ("Device, system and method for generating geofences based on public-safety factors"); U.S. patent Ser. No. 10/424,029 ("Method and system for providing a housing recommendation"); U.S. patent Ser. No. 10/360,443 ("System and method for detecting subliminal facial responses in response to subliminal stimuli"); U.S. patent Ser. No. 10/332,385 ("Location based support request messages responsive to alert recommendation"); and U.S. patent Ser. No. 10/296,961 ("Hybrid recommendation system").

Figure 9:
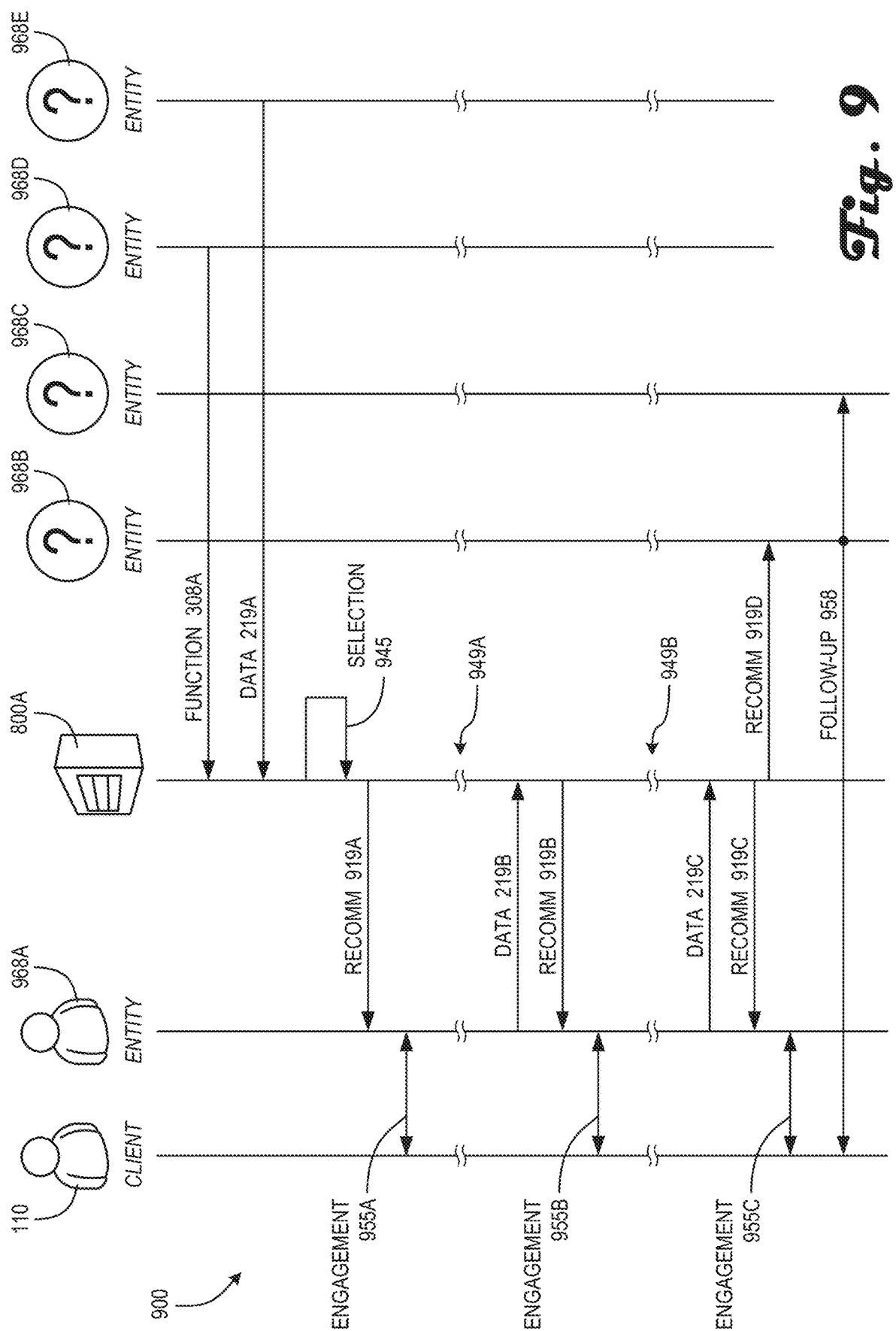
FIG. 9 depicts a particular scenario and progressive data flow in which mobile or other computing devices interact with one or more servers according to one or more improved technologies.

FIG. 9 depicts a particular scenario and progressive data flow 900 in which peer/mobile/computing devices (e.g. in use by one or more at-risk clients 110 or other entities 968) interact with one or more servers 800 according to one or more improved technologies pertaining to one or more encampments 225. A regional server 800A receives indicia of preferences 566 or other features of a profile 567 that quantifies a "scoring" function 308A that allows for progressive decision optimizations by quantifying what "success" means to one or more officials, sponsors, charitable organizations, or other stakeholder entities 968D. Such indicia allow the one or more servers to generate a selection 945 that informs recommendation-specific data 319 comprising one or more client-related or other encampment-related engagements 955A. In a context in which a computing device 700A used in the engagement 955A encounters a connectivity impairment 303 or other delay 949A, sometime later additional situational data 219B is uploaded to server 800A and informs next incremental recommendation data 319B comprising one or more next encampment or client engagements 955B. This can occur, for example, in a context in which engagement 955A was incomplete or in which a next/follow-up task 553 is indicated.

In a context 540, 640 in which computing device 700A encounters another delay 949B, sometime later additional situational data 219C is uploaded to server 800A and informs next incremental recommendation data 319C comprising one or more next encampment or client engagements 955C. Alternatively or additionally, in some contexts the additional situational data 219C may inform other recommendation data 319D pertaining to a recommended follow-up 958 between the engaged client(s) 110 and one or more other entities 968B-D whose participation is called for.

In some variants one or more download modules 202 or other event-sequencing logic thereby causes a first computing device 700 to be configured according to one or more special-purpose protocols 585A-H by which a first task 553A pertaining to the first encampment 225D is associated with a first resource 168A-B. This can occur, for example, in a context in which the first task 553A includes obtaining a first informational component 309 pertaining to a first feature 307A of the first encampment 225D and in which the first feature 307A has been prioritized over other features 307 of the first encampment 225D as (a component of) the first recommendation 919A. Alternatively or additionally one or more interface modules 206 jointly with other event-sequencing logic is configured to transmit one or more identifiers 328 of at least a second resource 168C-D pertaining to the first encampment 225D wherein one or more features 307 of the first encampment 225D are correlated with the first recommendation 919A; wherein a diagnostic protocol 585A by which the first recommendation 919A is correlated with the one or more features 307 of the first encampment 225D is delayed by a wireless connectivity impairment 303 affecting a wireless linkage 229 to the first computing device 700. This can occur, for example, in a context in which an expression 306 of the first recommendation 919A is apparently acted upon (e.g. inferred based upon Global Positioning System coordinates indicating a movement of the first computing device 70 in a manner that reduces a distance to the second resource 168C-D) soon after the expression 306 of the first recommendation 919A arrives at the first computing device 700 (e.g. within less than ten minutes) and in which the first recommendation 919A includes the one or more identifiers 328 of at least the second resource 168C-D pertaining to the first encampment 225.

Figure 10:
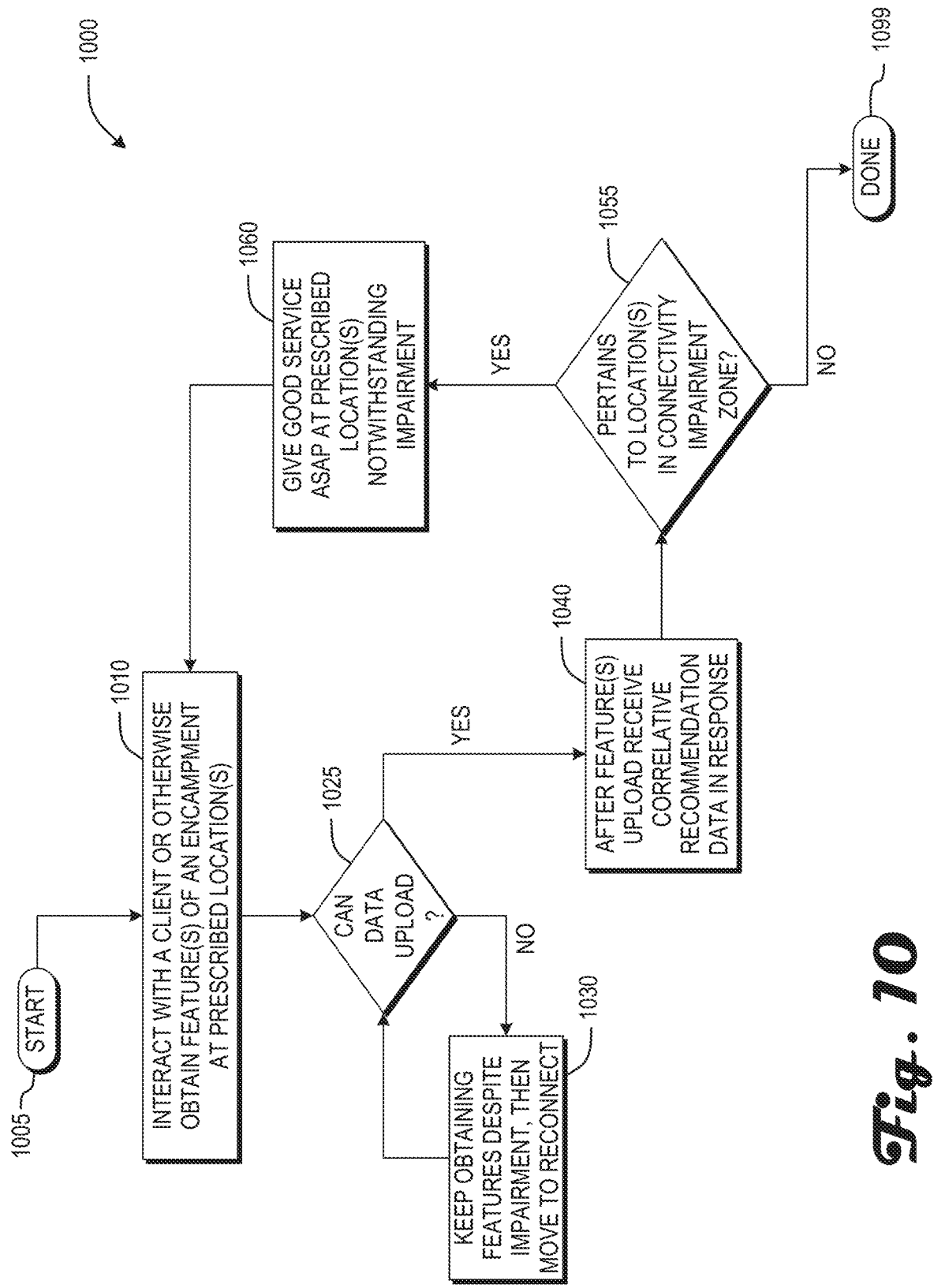
FIG. 10 depicts an operational flow in which one or more improved technologies may be incorporated.

Referring now to FIG. 10, there is shown an operational flow 1000 in which one or more improved technologies may be incorporated, optionally in concert with most or all events of FIG. 9. As will be recognized by those having ordinary skill in the art, an entity 968 (e.g. comprising a social worker or skilled volunteer with a mobile device 700) may perform some or all operations of flow 1000. Not all events of information and encampment management are illustrated in FIG. 10, however. Rather, for clarity, only those steps reasonably relevant to describing the distributed ledger interaction aspects of flow 1000 are shown and described. Those having ordinary skill in the art will also recognize the present embodiment is merely one exemplary embodiment and that variations on the present embodiment may be made without departing from the scope of the broader inventive concept set forth in the clauses and claims below.

After a start operation, 1005, operation 1010 describes a resource/entity interacting with a client or otherwise obtain feature(s) of an encampment at one or more prescribed locations. If data 219 obtained thereby cannot upload (at operation 1025), flow then passes to operation 1030 at which the resource/entity continues to obtain encampment or contextual features despite impairment and later travels to a location with better connectivity. Once data 219 can upload (again at operation 1025), flow then passes to operation 1040 at which the upload proceeds and correlative recommendation data 319 is received in response. Flow then passes to operation 1055.

Operation 1055 describes ascertaining whether the recommendation data pertains to locations in one or more connectivity impairment zones (e.g. traveling to a location 465 specified in one or more tasks 553 thereof to determine if there is wireless service available there). If so, control passes to operation 1060 and otherwise flow 1000 ends (at operation 1099).

Operation 1060 describes giving good service as soon as possible at one or more prescribed locations notwithstanding impairment (e.g. performing one or more tasks while offline). Control then passes back to operation 1010.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, first combinations of aspects and embodiments are articulated in a shorthand form such that (1) according to respective embodiments, for each instance in which a "component" or other such identifiers appear to be introduced (e.g., with "a" or "an,") more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES

1. A data-driven method for managing at least a first encampment 225 of individuals comprising:
invoking transistor-based circuitry (e.g. one or more download modules 202) configured to cause a first computing device 700 to be configured according to one or more special-purpose protocols 585 by which (recommendation data 319 establishing) a first recommendation 919 is obtained that comprises a first human or other resource 168 performing a first task 553 that comprises obtaining one or more primary informational components 309 pertaining to the first encampment 225; and
invoking transistor-based circuitry (e.g. one or more interface modules 206) configured to signal (one or more invitations to, details about, or other features 307 pertaining to) a first interactive event 311 at least between a second resource 168 and the first encampment 225 (at least partly) based on a first correlation 565 or other association 327 between the second resource 168 and a first informational component 309 of the one or more primary informational components 309.

2. The method of any of the above clauses wherein the one or more primary informational components 309 have a higher (range or level of) prioritization 329 than that of at least one secondary informational component 309.

3. The method of any of the above clauses wherein the first feature 307A has been prioritized over other features 307 of the first encampment 225 by one or more machine learning modules 205 as first recommendation 919A partly based on one or more success-indicative scoring functions 308 configured to generate the first recommendation 919A and partly based on training data 219 pertaining to one or more other encampments 225.

4. The method of any of the above clauses wherein transmission of a first feature 307A from the first computing device 700 and a diagnostic protocol 585A by which the first recommendation 919A is correlated with the one or more features 307 of the first encampment 225 are both delayed by a wireless connectivity impairment 303 affecting a wireless linkage 229 to the first computing device 700 and wherein an expression 306 of the first recommendation 919A can apparently be acted upon (e.g. by relaying some or all of it or escorting the client 110 in a prescribed manner) right away after the expression 306 of the first recommendation 919A arrives at the first computing device 700 (e.g. within less than 5 minutes).

5. The method of any of the above clauses wherein the first interactive event 311 has been selected at least between a second resource 168 and the first encampment 225 partly based on a first correlation 565 between the second resource 168 and the first informational component 309 of the one or more primary informational components 309 and partly based on a correlation 565 between the first interactive event 311, a second informational component 309 of the one or more primary informational components 309, and a success-indicative performance metric as the first correlation 565.

6. The method of any of the above clauses wherein a diagnostic protocol 585A by which the first recommendation 919A is correlated with the one or more features 307 of the first encampment 225 is delayed by a wireless connectivity impairment 303 affecting a wireless linkage 229 to the first computing device 700 and wherein an expression 306 of the first recommendation 919A is apparently acted upon (e.g. as inferred by one or more objective indications 545 how a data recipient interacts, prioritizes tasks, or otherwise behaves being detected by one or more event response modules 203 herein) less than 24 hours after the expression 306 of the first recommendation 919A arrives to the first computing device 700.

7. The method of any of the above clauses wherein a diagnostic protocol 585A by which the first recommendation 919A is correlated with the one or more features 307 of the first encampment 225 is delayed by a wireless connectivity impairment 303 affecting a wireless linkage 229 to the first computing device 700 and wherein an expression 306 of the first recommendation 919A is impliedly to be acted upon soon (e.g. less than 30 minutes) after the expression 306 of the first recommendation 919A arrives at the first computing device 700.

8. The method of any of the above clauses wherein transmission of a first feature 307A from the first computing device 700 is delayed by a wireless connectivity impairment 303 affecting a wireless linkage 229 to the first computing device 700 and wherein an expression 306 of the first recommendation 919A is apparently acted upon at least by the first client 110A-B right away (e.g. less than 5 minutes) after the expression 306 of the first recommendation 919A arrives at the first computing device 700.

9. The method of any of the above clauses wherein transmission of a first feature 307A from the first computing device 700 and a diagnostic protocol 585A by which the first recommendation 919A is correlated with the one or more features 307 of the first encampment 225 are both delayed by a wireless connectivity impairment 303 affecting a wireless linkage 229 to the first computing device 700 and wherein an expression 306 of the first recommendation 919A is apparently acted upon right away at least by the first client 110A-B or by the first resource 168A.

10. The method of any of the above clauses wherein transmission of a first feature 307A from the first computing device 700 is delayed by a wireless connectivity impairment 303 affecting a wireless linkage 229 to the first computing device 700 and wherein an expression 306 of the first recommendation 919A is apparently acted upon right away (e.g. less than 5 minutes) after the expression 306 of the first recommendation 919A arrives at the first computing device 700.

11. The method of any of the above clauses wherein an expression 306 of (at least some) additional recommendation data 319 (e.g. comprising an additional recommendation 919) is wirelessly transmitted to the first computing device 700 after a wireless connectivity impairment 303 affecting a wireless linkage 229 to the first computing device 700 and wherein the expression 306 of the second recommendation 919B is apparently acted upon right away (e.g. less than 5 minutes after the expression 306 of the second recommendation 919B arrives at the first computing device.

12. The method of any of the above clauses wherein at least some of the feature(s) 307 of the first encampment 225 is (captured or otherwise) obtained at the first computing device 700 while the first computing device 700 is in a zone 125 with wireless connectivity impairment 303 (preventing or otherwise) impairing a wireless linkage 229 to the first computing device 700.

13. The method of any of the above clauses wherein at least some of the feature(s) 307 of the first encampment 225 are obtained at the first computing device 700 while the first computing device 700 is in a zone 125 with wireless connectivity impairment 303 affecting a first (otherwise generally reliable) wireless linkage 229 between the first computing device 700 and one or more networks 250, 350; and wherein an expression 306 of recommendation data 319 that describes at least a location 465 of a next resource 168C-D is provided in response 360 to the feature(s) 307 of the first encampment 225 is provided via the first computing device 700 soon after soon after the recommendation data 319 arrives to the first computing device 700 at a zone 125 with wireless connectivity impairment 303.

14. The method of any of the above clauses wherein the second resource 168C-D has been identified by one or more machine learning modules 205 as an additional recommendation 919 partly based on success-indicative scoring function 308 and partly based on the second feature 307A of the first encampment 225.

15. The method of any of the above clauses wherein the second resource 168C-D has been (directly or otherwise) identified by one or more machine learning modules 205 as an additional recommendation 919 (at least partly) based on the second feature 307A of the first encampment 225.

16. The method of any of the above clauses wherein the second resource 168C-D has been (directly or otherwise) identified by one or more machine learning modules 205 as an additional recommendation 919 (at least partly) based on the second feature 307A of the first encampment 225 wherein the second feature 307 comprises a particular wireless connectivity impairment 303 (e.g. intermittent or absent cellular service) at one or more locations 465 in the first encampment 225.

17. The method of any of the above clauses wherein the second resource 168C-D has been identified by one or more machine learning modules 205 as an additional recommendation 919 based on the second feature 307A of the first encampment 225 and wherein the second feature 307A comprises a count 445 of objects 177 observed at (one or more parts of) the first encampment 225.

18. The method of any of the above clauses wherein the second resource 168C-D has been identified by one or more machine learning modules 205 as an additional recommendation 919 based on the second feature 307A of the first encampment 225 and wherein the second feature 307A comprises one or more updates 405 observed at the first encampment 225 (e.g. pertaining to lighting levels, crime rates, or other conditions thereof).

19. The method of any of the above clauses wherein the second resource 168C-D has been identified by one or more machine learning modules 205 as an additional recommendation 919B-D (at least partly) based on the second feature 307A of the first encampment 225 and wherein the second feature 307A pertains to the first encampment 225 (at least) by virtue of pertaining to a client 110 who has recently taken shelter in the first encampment 225.

20. The method of any of the above clauses wherein the second resource 168C-D has been (directly or otherwise) identified by one or more machine learning modules 205 as an additional recommendation 919 based on the second feature 307A of the first encampment 225 and wherein the second feature 307A comprises a clip 244, image 245, type identifier 328, or other digital characterization of a client 110 who has recently taken shelter in the first encampment 225.

21. The method of any of the above clauses wherein the second resource 168C-D has been identified by one or more machine learning modules 205 as an additional recommendation 919 based on the second feature 307A of the first encampment 225 and wherein the second feature 307A comprises a video or audio clip 244 of (at least some of) the first encampment 225.

22. The method of any of the above clauses wherein the second resource 168C-D has been identified by one or more machine learning modules 205 as an additional recommendation 919B-D based on the second feature 307A of the first encampment 225 and wherein the second feature 307A comprises a digital image 245 of one or more objects 177 that characterize (at least part of) the first encampment 225.

23. The method of any of the above clauses wherein the second resource 168C-D has been identified by one or more machine learning modules 205 as an additional recommendation 919 (at least partly) based on the second feature 307A of the first encampment 225 and wherein the second feature 307A comprises a count 445 of one or more (types of drug paraphernalia, shelter, transportation, or other) inanimate objects 177 that characterize the first encampment 225.

24. The method of any of the above clauses wherein the second resource 168C-D has been identified by one or more machine learning modules 205 as an additional recommendation 919B-D partly based on success-indicative scoring function 308 and partly based on the second feature 307A of the first encampment 225 and wherein the second feature 307A comprises a count 445 of one or more (types of recently-arrived, recently-removed, or other) inanimate objects 177 that characterize a state 489 of the first encampment 225.

25. The method of any of the above clauses wherein the second resource 168C-D has been identified by one or more machine learning modules 205 as an additional recommendation 919 based on the second feature 307A of the first encampment 225 and wherein the second feature 307A comprises a digital image 245 of (at least part of) the first encampment 225.

26. The method of any of the above clauses wherein the second resource 168C-D has been identified by one or more machine learning modules 205 as an additional recommendation 919 based on the second feature 307A of the first encampment 225 and wherein the second feature 307A comprises a risk-indicative, size-indicative, growth-rate-indicative, or other type identifier 328 of the first encampment 225.

27. The method of any of the above clauses wherein a first (printed component or other) expression 306 of (at least some) additional recommendation data 319 is physically handed to the client 110 right away (i.e. less than 5 minutes) after being identified.

28. The method of any of the above clauses wherein the first task 553A includes a (data acquisition protocol 585E or other) first informational component 309 provided by one or more machine learning modules 205 configured to generate first recommendation 919A partly based on a client-success-indicative scoring function 308 and partly based on the first feature 307A of the first encampment 225.

29. The method of any of the above clauses wherein the first task 553A includes a (data acquisition protocol 585E or other) first informational component 309 provided by one or more machine learning modules 205 configured to generate first recommendation 919A partly based on a content-success-indicative scoring function 308 (e.g. likes or playback events associated with online content) and partly based on the first feature 307A of the first encampment 225.

30. The method of any of the above clauses wherein the first task 553A includes a (data acquisition protocol 585E or other) first informational component 309 provided by one or more machine learning modules 205 configured to generate first recommendation 919A (at least partly) based on a client-success-indicative scoring function 308 pertaining to a development 400 of a first client 110 associated with the first encampment 225.

31. The method of any of the above clauses wherein the first task 553A includes a data acquisition protocol 585E that comprises one or more machine learning modules 205 obtaining or otherwise triggering a first informational component 309 based on a machine-implemented scoring function 308.

32. The method of any of the above clauses wherein the first task 553A includes a (data acquisition protocol 585E or other) first informational component 309 provided by one or more machine learning modules 205 configured to generate first recommendation 919A (at least partly) based on a content-success-indicative scoring function 308 pertaining to content 554 relating to a development 400 of a first client 110 associated with the first encampment 225.

33. The method of any of the above clauses wherein the first task 553A includes a (data acquisition protocol 585E or other) first informational component 309 provided by one or more machine learning modules 205 configured to generate first recommendation 919A (at least partly) based on a content-success-indicative scoring function 308 pertaining to content 554 relating to a development 400 associated with the first encampment 225.

34. The method of any of the above clauses wherein the first task 553A includes a (data acquisition protocol 585E or other) first informational component 309 provided by one or more machine learning modules 205 configured to generate first recommendation 919A (at least partly) based on a client-success-indicative or content-success-indicative scoring function 308 pertaining to a development 400 of the first client 110.

35. The method of any of the above clauses wherein the first task 553A includes (obtaining, requesting, or otherwise triggering) a first informational component 309 provided by one or more machine learning modules 205 configured to generate first recommendation 919A (at least partly) based on a success-indicative scoring function 308 and partly based on a first observed feature 307A of the first encampment 225.

36. The method of any of the above clauses wherein the first task 553A includes (obtaining, requesting, or otherwise triggering) a first informational component 309 provided by one or more machine learning modules 205 configured to generate first recommendation 919A (at least partly) based on a success-indicative scoring function 308 and partly based on a first feature 307A of the first encampment 225.

37. The method of any of the above clauses wherein the first feature 307A has been prioritized over other features 307 of the first encampment 225 as first recommendation 919A at least partly based on one or more success-indicative scoring functions 308.

38. The method of any of the above clauses wherein the first feature 307A has been prioritized over other features 307 of the first encampment 225 as first recommendation 919A at least partly based on one or more success-indicative scoring functions 308 by one or more machine learning modules 205 configured to generate the first recommendation 919A at least partly based on the one or more success-indicative scoring functions 308.

39. The method of any of the above clauses wherein the first feature 307A has been prioritized over other features 307 of the first encampment 225 as first recommendation 919A at least partly based on one or more success-indicative scoring functions 308 by one or more machine learning modules 205 configured to generate the first recommendation 919A partly based on the one or more success-indicative scoring functions 308 and partly based on training data 219 pertaining to one or more other encampments 225 and wherein the one or more machine learning modules 205 comprise a neural network.

40. The method of any of the above clauses comprising:
signaling (by one or more local modules 354) the first interactive event 311 selectively at least between the second resource 168 and a human or other feature 307 of the first encampment 225 partly based on the first (correlation 565 or other) association 327 between (a selection of) the second resource 168 and at least a first informational component 309 of the one or more primary informational components 309 and partly based on a correlation 565 between (a type of) the first interactive event 311 and a success-indicative performance metric (e.g. an improvement count 445 or other scoring function 308) reported with regard to one or more other encampments 225 remote (e.g. by more than 50 km) from the first encampment.

41. The method of any of the above clauses comprising:
recommending or otherwise defining (by one or more programmatic response modules 203) the first interactive event 311 selectively at least among the second resource 168, a client 110 associated with the first encampment 225, and specific presentation hardware 712 deemed necessary to implement one or more protocols 585 at the first interactive event 311.

42. The method of any of the above clauses comprising:
scheduling or otherwise coordinating (by one or more selection modules 204) the first interactive event 311 at least among the second resource 168, a client 110 associated with the first encampment 225, and special-purpose circuitry 722 (e.g. a camera, microphone, or other unit containing a sensor 304) deemed necessary to capture/establish a state 489 of at least the first client 110 at the first interactive event 311.

43. The method of any of the above clauses comprising:
sequencing or otherwise coordinating (by one or more control modules 201) the first interactive event 311 selectively at least among the second resource 168, a client 110 associated with the first encampment 225, and special-purpose circuitry 722 deemed helpful for establishing a state 489 of a location 465 in or near the first encampment 225 (i.e. within 1 km) at the first interactive event 311.

44. The method of any of the above clauses wherein the first association 327 between the second resource 168 and a first informational component 309 of the one or more primary informational components 309 was established by the second resource 168 having a permit or license that identifies (a type of at least one of) the one or more primary informational components 309.

45. The method of any of the above clauses wherein the first association 327 between the second resource 168 and a scalar informational component 309 (e.g. a count of same-family clients 110 taking shelter in the first encampment 225 or a particular client's age) of the one or more primary informational components 309 was established by the second resource 168 having provided one or more thresholds pertaining to the scalar informational component 309 (e.g. a request that sibling-children clients 110 or school-age children clients 110 be referred to a particular foster home resource) of the one or more primary informational components 309.

46. The method of any of the above clauses wherein the first association 327 between the second resource 168 and a particular informational component 309 of the one or more primary informational components 309 was established by the second resource 168 having one or more credentials (e.g. a viral video clip 244, housing or employment placement referral history, peer-reviewed article, dissertation, or other such digital content 554) that identify the one or more primary informational components 309.

47. The method of any of the above clauses wherein a sponsor of a current project or development 400 has assigned the higher (range or level of) prioritization 329 to at least some of the one or more primary informational components 309 but not to the secondary informational component 309.

48. The method of any of the above clauses wherein the first task 553 comprises signaling a risk or severity level as a feature 307 of the first encampment 225 (e.g. as one or more reported crime count 445 or estimated crime rates there) as one of the one or more primary informational components 309.

49. The method of any of the above clauses wherein the first task 553 comprises signaling a primary need 559 as a feature 307 of the first encampment 225 (e.g. as an alphanumeric expression 306 like "beds," "counseling," "food," "clothing," or other such identifiers 328 of goods or services) as one of the one or more primary informational components 309.

50. The method of any of the above clauses wherein the first task 553 comprises signaling a size as a feature 307 of the first encampment 225 (e.g. as an estimated number of shelters thereof or of individuals sheltering there) as one of the one or more primary informational components 309.

51. The method of any of the above clauses wherein the first task 553 comprises signaling a growth rate as a feature 307 of the first encampment 225 (e.g. as an alphanumeric expression 306 or scalar value) as one of the one or more primary informational components 309.

52. The method of any of the above clauses wherein signaling the first interactive event 311 comprises signaling a capture of an image 245 of the first client 110 as a component 309 of the first interactive event 311.

53. The method of any of the above clauses wherein signaling the first interactive event 311 comprises signaling a capture of a video clip 244 of (at least) the first client 110 as a component 309 of the first interactive event 311.

54. The method of any of the above clauses wherein signaling the first interactive event 311 comprises signaling a capture of a video clip 244 of (at least) the first client 110 interacting with a particular influencer 668 as a component 309 of the first interactive event 311.

55. The method of any of the above clauses wherein signaling the first interactive event 311 comprises signaling a capture of a recorded interaction between the first client 110 another resource 168 (e.g. a particular influencer 668 or service provider) as a component 309 of the first interactive event 311.

56. The method of any of the above clauses wherein signaling the first interactive event 311 comprises signaling a capture of a timestamp 246 of the first interactive event 311 as a component 309 of the first interactive event 311.

57. The method of any of the above clauses wherein signaling the first interactive event 311 comprises automatically scheduling the first interactive event 311.

58. The method of any of the above clauses wherein signaling the first interactive event 311 comprises automatically suggesting the first interactive event 311.

59. The method of any of the above clauses wherein signaling the first interactive event 311 comprises automatically ordering the first interactive event 311.

60. The method of any of the above clauses wherein signaling the first interactive event 311 comprises selectively prioritizing the first interactive event 311 above one or more other interactive events.

61. The method of any of the above clauses wherein signaling the first interactive event 311 comprises automatically causing the first interactive event 311.

62. The method of any of the above clauses wherein signaling the first interactive event 311 comprises automatically configuring the first interactive event 311 using one or more protocols 585 described herein.

63. The method of any of the above clauses wherein signaling the first interactive event 311 comprises signaling a consultation or interview as a component 309 of the first interactive event 311.

64. The method of any of the above clauses wherein signaling the first interactive event 311 comprises signaling a client visit as a component 309 of the first interactive event 311.

65. The method of any of the above clauses wherein the first task 553 is "selectively" prioritized at least insofar that it has a higher prioritization 329 than (that of) a task of obtaining the secondary informational component 309.

66. The method of any of the above clauses wherein the first task 553 is "selectively" prioritized at least insofar that it has a higher prioritization 329 than any task of referring a client 110 to other resources 168.

67. The method of any of the above clauses wherein the one or more primary informational components 309 previously obtained the higher prioritization 329 thereof (at least partly) based on the one or more primary informational components 309 having been selected by a city council, private sponsor, or other authorized resource 168.

68. The method of any of the above clauses wherein the one or more primary informational components 309 previously obtained the higher prioritization 329 thereof (at least partly) based on the one or more primary informational components 309 having been recommended by an established human resource 168 (e.g. a consultant or assembly of crowdworkers).

69. The method of any of the above clauses wherein the one or more primary informational components 309 previously obtained the higher (range or level of) prioritization 329 thereof based on the one or more primary informational components 309 having been recommended by an established computing resource 168 (e.g. an expert system or neural network).

70. The method of any of the above clauses wherein the one or more primary informational components 309 previously obtained the higher prioritization 329 thereof based on (a selection 945 of) the one or more primary informational components 309 having been correlated at least with a content-success-indicative performance metric (e.g. a count 445 of online hits, donations or likes as a scoring function 308 signaling popular approval of clips 244 or other content 554 portraying a situational improvement or other desired development 400 in regard to one or more other encampments 225).

71. The method of any of the above clauses wherein the one or more primary informational components 309 previously obtained the higher prioritization 329 thereof (at least partly) based on (a selection of) the one or more primary informational components 309 having been correlated at least with a client-success-indicative performance metric (e.g. a count 445 of resources distributed, services given, or clients 110 whose living conditions improved as a scoring function 308 signaling a desired development 400 in regard to one or more other encampments 225).

72. The method of any of the above clauses wherein the one or more primary informational components 309 is programmatically selected partly based on a content-success-indicative performance metric and partly based on a content-success-indicative performance metric (e.g. as respective scoring functions 308).

73. The method of any of the above clauses wherein the first interactive event 311 previously obtained the higher prioritization 329 thereof (at least partly) based on the first interactive event 311 having been selected by a city council, private sponsor, or other authorized resource 168.

74. The method of any of the above clauses wherein the first interactive event 311 previously obtained the higher prioritization 329 thereof (at least partly) based on the first interactive event 311 having been recommended by an established human resource 168 (e.g. a consultant or assembly of crowdworkers).

75. The method of any of the above clauses wherein the first interactive event 311 previously obtained the higher prioritization 329 thereof (at least partly) based on the first interactive event 311 having been recommended by an established computing resource 168 (e.g. an expert system or neural network).

76. The method of any of the above clauses wherein the first interactive event 311 previously obtained the higher prioritization 329 thereof (at least partly) based on (a selection of) the first interactive event 311 having been correlated at least with a content-success-indicative performance metric (e.g. a count 445 of online hits, donations or likes as a scoring function 308 signaling popular approval of clips 244 or other content 554 portraying a situational improvement or other desired development 400 in regard to one or more other encampments 225).

77. The method of any of the above clauses wherein the first interactive event 311 previously obtained the higher prioritization 329 thereof (at least partly) based on (a selection of) the first interactive event 311 having been correlated at least with a client-success-indicative performance metric (e.g. a count 445 of resources distributed, services given, or clients 110 whose living conditions improved as a scoring function 308 signaling a desired development 400 in regard to one or more other encampments 225).

78. The method of any of the above clauses wherein the first interactive event 311 is programmatically selected partly based on a content-success-indicative performance metric and partly based on a content-success-indicative performance metric (e.g. as respective scoring functions 308).

79. The method of any of the above clauses wherein the one or more identifiers 328 of at least the second resource 168C-D pertaining to the first encampment 225 are sent in response 360 to a completion of the first task 553A.

80. The method of any of the above clauses wherein the one or more identifiers 328 of at least the second resource 168C-D pertaining to the first encampment 225 are sent at least to the second resource 168C-D in response 360 to a completion of the first task 553A.

81. The method of any of the above clauses wherein the one or more identifiers 328 of at least the second resource 168C-D pertaining to the first encampment 225 are sent at least to the second resource 168C-D in response 360 to a completion of the first task 553A by the first resource 168A-B.

82. The method of any of the above clauses wherein the first recommendation 919 pertaining to the first encampment 225 are sent at least to the second resource 168C-D in response 360 to a completion of the first task 553A by the first resource 168A-B.

83. The method of any of the above clauses wherein the one or more features 307 of the first encampment 225 are individually or otherwise correlated by artificial intelligence (e.g. a machine learning module 205) with the first recommendation 919.

84. The method of any of the above clauses wherein the first features 307 of the first encampment 225 is correlated with the first recommendation 919.

85. The method of any of the above clauses wherein the first task 553A includes a data acquisition protocol 585E that comprises obtaining or otherwise triggering a first informational component 309 (at least partly) based on a machine-implemented scoring function 308.

86. The method of any of the above clauses wherein the first task 553A includes (obtaining, requesting, or otherwise triggering) a first informational component 309 (at least partly) based on a success-indicative scoring function 308.

87. The method of any of the above clauses wherein the first task 553A implements a data acquisition protocol 585E that comprises:
implementing a scoring protocol 585G that includes obtaining (one or more images 245 or other) digital content 554 portraying 554 a current state 489 of the first encampment 225 and associated with a particular influencer 668; allowing at least some of the digital content 554 to be published as first online content 554; implementing a decision protocol 585 that prioritizes a subsequent interactive event 311 according to how many quantified-endorsement-related indications 545 are associated with the first online content 554 by one or more software implementations (e.g. a neural network or other machine-learning modules 205) as described herein.

88. The method of any of the above clauses wherein the first task 553A implements a data acquisition protocol 585E that comprises:
implementing a scoring protocol 585G that includes obtaining one or more clips 244 pertaining to the first encampment 225 and associated with a particular influencer 668; allowing at least some of the one or more clips 244 to be published online as part of the one or more primary informational components; implementing a decision protocol 585 that prioritizes a subsequent interactive event 311 (e.g. an update 405 or protocol 585) according to how many quantified-endorsement-related indications 545 are thereafter associated with the first online content 554 by one or more machine-learning modules 205 as described herein.

89. The method of any of the above clauses wherein the first task 553A implements a data acquisition protocol 585E that comprises:
implementing a scoring protocol 585G that includes obtaining an audio or video clip 244 pertaining to the first encampment 225 and (made or influenced by or otherwise) associated with a particular influencer 668; allowing (a version or portion of) the audio or video clip 244 to be published (on a social media platform 580 or otherwise) as first online content 554;
implementing a decision protocol 585 that prioritizes a next update 405 or protocol 585 (or both) according to how many viewership, popular approval, volunteerism, or other quantified-endorsement-related indications 545 are associated with the first online content 554 by one or more machine-learning modules 205 using them as a content-success-indicative, client-success-indicative, or other scoring function 308 positively or otherwise indicative of success.

90. The method of any of the above clauses wherein the first computing device 700 is configured in response 360 to an action by a user thereof.

91. The method of any of the above clauses wherein the first computing device 700 is configured by loading an app 754, upgrade, expansion, or other special-purpose digital content 554 therein.

92. The method of any of the above clauses wherein the first computing device 700 is configured in response 360 to an authorization by a user thereof (e.g. a gig/social/volunteer worker or influencer 668) and wherein the first computing device comprises one or more of a drone, passenger or delivery vehicle, handheld, wearable, or other "smart" device 700.

93. The method of any of the above clauses wherein the first task 553A comprises (at least a component 309 qualified as) a client-specific task 553.

94. The method of any of the above clauses wherein the first task 553A comprises (at least a component 309 qualified as) a location-specific task 553.

95. The method of any of the above clauses wherein the first task 553A comprises (at least a component 309 qualified as) an encampment-specific task 553.

96. The method of any of the above clauses wherein the first task 553A comprises (at least a component 309 qualified as) a first-resource-specific task 553.

97. The method of any of the above clauses wherein the first task 553A comprises (at least a component 309 qualified as) a second-resource-specific task 553.

98. The method of any of the above clauses wherein (an expression of) the first task 553A pertaining to the first encampment 225 signals (what one skilled in the art would understand as) the first task and comprises at least one of an alphanumeric description, an operational sequence, an identifier 328 of one or more protocols 585A-H, or other such definitional expression 306.

99. The method of any of the above clauses wherein the first task 553A implements a data acquisition protocol 585E that comprises:

implementing a scoring protocol 585G that includes obtaining an audio or video clip 244 pertaining to the first encampment 225 and featuring a politician or business owner as a local influencer 668; allowing (a version or portion of) the audio or video clip 244 to be published first online content 554; implementing a decision protocol 585 that prioritizes a next update 405 or protocol 585 (or both) according to how many views, likes, or other quantified-endorsement-related indications 545 are associated (e.g. according to a preference profile 567 of the local influencer 668) with the first online content 554 as a success-indicative scoring function 308.

100. The method of any of the above clauses wherein the first task 553A implements a data acquisition protocol 585E that comprises:

implementing a scoring protocol 585G that includes obtaining an audio or video clip 244 pertaining to the first encampment 225 and (made or influenced by or otherwise) associated with a particular influencer 668; allowing (a version or portion of) the audio or video clip 244 to be published first online content 554; implementing a decision protocol 585 that prioritizes a next update 405 or protocol 585 (or both) according to how many viewership, popular approval, volunteerism, or other quantified-endorsement-related indications 545 are associated with the first online content 554 as one or more machine-learning modules using it/them as a success-indicative scoring function 308 as described herein.

101. The method of any of the above clauses wherein the first task 553A includes a data acquisition protocol 585E associated with the first encampment 225 that comprises one or more artificial intelligence modules (e.g. machine learning modules 205) obtaining or otherwise triggering a first informational component 309 based on a machine-implemented scoring function 308 that has been applied to training data 219 associated with one or more other encampments 225A-C that are remote (e.g. more than 100 kilometers away) from the first encampment 225.

102. The method of any of the above clauses wherein the first task 553A includes a data acquisition protocol 585E associated with the first encampment 225 that comprises one or more machine learning modules 205 obtaining or otherwise triggering a first informational component 309 based on a machine-implemented scoring function 308 that has been applied to training data 219 associated with one or more other encampments 225A-C, 225E-G that are remote (e.g. more than 100 kilometers away) from the first encampment 225.

103. The method of any of the above clauses wherein the first task 553A includes one or more machine learning modules 205 triggering a first informational component 309 (at least partly) based on a success-indicative scoring function 308.

104. The method of any of the above clauses wherein the first task 553A implements a data acquisition protocol 585E that implements a site monitoring protocol 585F by which one or more hardware installations or other updates 405 indicative of situational development 400 pertaining to states 489 of a location 465 in or near the first encampment 225 are obtained.

105. The method of any of the above clauses wherein the first task 553A implements a site monitoring protocol 585F pursuant to a hardware recommendation protocol 585B pertaining to a location 465 in or near the first encampment 225 that has been associated (e.g. by an expert or artificial intelligence) with a need 559 for (a presence of) more/better onsite waste disposal resources 168, 541.

106. The method of any of the above clauses wherein the first task 553A implements a site monitoring protocol 585F pursuant to a hardware recommendation protocol 585B pertaining to a location 465 in or near the first encampment 225 that has been associated (e.g. by an expert or artificial intelligence) with a need 559 for (access to) more/better onsite monitoring modules 354 (e.g. cameras or microphones).

107. The method of any of the above clauses wherein the first task 553A implements a site monitoring protocol 585F pursuant to a hardware recommendation protocol 585B pertaining to a location 465 in or near the first encampment 225 that has been associated (e.g. by an expert or artificial intelligence) with a need 559 for (a presence of) more/better onsite security resources 168, 541.

108. The method of any of the above clauses wherein the first task 553A implements a site monitoring protocol 585F pursuant to a hardware recommendation protocol 585B pertaining to a location 465 in or near the first encampment 225 that has been associated (e.g. by an expert or artificial intelligence) with a current need 559 for (a presence of) more/better onsite law enforcement resources 168, 541.

109. The method of any of the above clauses wherein the first task 553A implements a site monitoring protocol 585F pursuant to a hardware recommendation protocol 585B pertaining to a location 465 in or near the first encampment 225 that has been associated (e.g. by an expert or artificial intelligence) with a local need 559 for more/better onsite healthcare resources 168, 541 (e.g. for dispensing masks or medications).

110. The method of any of the above clauses wherein the first task 553A implements a site monitoring protocol 585F pursuant to a hardware recommendation protocol 585B pertaining to a location 465 in or near the first encampment 225 that has been selectively associated (e.g. by an expert or artificial intelligence) with a need 559 for (a presence of) more/better onsite digital playback content delivery resources 168, 541 (e.g. speakers or display screens).

111. The method of any of the above clauses wherein the first task 553A implements a data acquisition protocol 585E that implements a site monitoring protocol 585F by which one or more mitigations or other updates 405 indicative of situational development 400 pertaining to a location 465 in or near the first encampment 225 are obtained in association 327 with one or more measurements indicative of situational development 400 before and after states 489 of a location 465 in or near the first encampment 225 are obtained that demonstrate how successful the one or more mitigations or other updates 405 were.

112. The method of any of the above clauses wherein the first task 553A implements a data acquisition protocol 585E that comprises a site monitoring protocol 585F by which one or more counts 445 or other scalar measurements indicative of situational development 400 pertaining to periodic or other occasional states 489 of a location 465 in or near the first encampment are obtained.

113. The method of any of the above clauses wherein the first task 553A implements a data acquisition protocol 585E that comprises a site monitoring protocol 585F by which one or more progress-indicative images 245 (positively or otherwise) indicative of situational development 400 (i.e. relative to an earlier or later depiction of a state 489 of a location 465 in or near the first encampment of at-risk individuals) are obtained.

114. The method of any of the above clauses wherein the first task 553A implements a data acquisition protocol 585E.

115. The method of any of the above clauses wherein the first task 553A implements a data acquisition protocol 585E that comprises a client intake protocol 585D.

116. The method of any of the above clauses wherein the first task 553A comprises registering one or more clients 110 via an intake protocol 585D.

117. The method of any of the above clauses wherein the first task 553A implements a data acquisition protocol 585E that comprises a client intake protocol 585D.

118. The method of any of the above clauses wherein the first task 553A implements a client intake protocol 585D that comprises a medical testing protocol 585C.

119. The method of any of the above clauses wherein the first task 553A implements a client intake protocol 585D that comprises a medical testing protocol 585C that is conditionally and programmatically associated with a therapeutic or other subsequent healthcare protocol 585.

120. The method of any of the above clauses wherein the first task 553A implements a client intake protocol 585D that comprises a medical testing protocol 585C that is programmatically associated with a therapeutic subsequent healthcare protocol 585 access to which is conditioned upon an outcome of the medical testing protocol 585C.

121. The method of any of the above clauses wherein the first task 553A implements a data acquisition protocol 585E that comprises a client intake protocol 585D by which one or more particular needs 559 of a client 110 are ascertained (e.g. as a precursor to incentivization toward or other conditionally-accessible later service administered via a second resource 168C-D).

122. The method of any of the above clauses wherein the first task 553A implements a data acquisition protocol 585E that comprises a client-registration-type intake protocol 585D.

123. The method of any of the above clauses wherein the first task 553A implements a data acquisition protocol 585E that comprises a client-registration-type intake protocol 585D by which one or more clients 110 obtain a (badge or other) picture identification as a tangible indication 545 of their identity.

124. The method of any of the above clauses wherein the first task 553A implements a data acquisition protocol 585E that comprises a client-registration-type intake protocol 585D by which one or more clients 110 obtain a (voucher or other) anonymous picture identification as a secure but non-transferable tangible indication 545 of one or more of their needs 559 that selectively allows them access to one or more later services (e.g. dispensed via a second resource 168C-D).

125. The method of any of the above clauses wherein the first task 553A implements a data acquisition protocol 585E that comprises a client-registration-type intake protocol 585D by which one or more clients 110 obtain a (voucher or other) picture identification as a non-unique and non-transferable tangible indication 545 of one or more of their needs 559.

126. The method of any of the above clauses wherein the first task 553A implements a data acquisition protocol 585E that comprises a client-registration-type intake protocol 585D by which one or more clients 110 obtain a (badge or other) picture identification as a unique indication 545 of their identity across multiple subsequent encounters 486 by which their (progressive or other) situational development 400 is documented.

127. The method of any of the above clauses wherein the first task 553A implements a data acquisition protocol 585E that comprises a data capture protocol 585H that includes obtaining an onsite clip 244 (at least partly) via a microphone (as a sensor 304).

128. The method of any of the above clauses wherein the first task 553A implements a data acquisition protocol 585E that comprises a data capture protocol 585H that includes obtaining an onsite clip 244 via a stationary mounted camera (as a sensor 304).

129. The method of any of the above clauses wherein the first task 553A implements a data acquisition protocol 585E that comprises a data capture protocol 585H that includes obtaining a clip 244 (at least partly) depicting a first client 110 who is associated with the first encampment 225.

130. The method of any of the above clauses wherein the first task 553A implements a data acquisition protocol 585E that comprises a data capture protocol 585H that includes obtaining at least one image 245 of a first client 110 who is associated with the first encampment 225 (at least) by virtue of having recently taken shelter in the first encampment 225 (e.g. within 2-4 days prior to the image).

131. The method of any of the above clauses wherein the first task 553A implements a data acquisition protocol 585E that comprises a data capture protocol 585H that includes obtaining at least one image 245 of a first client 110 who is associated with the first encampment 225 (at least) by virtue of being in a vicinity 100 of the first encampment 225.

132. The method of any of the above clauses wherein the first task 553A implements a data acquisition protocol 585E that comprises a data capture protocol 585H that includes obtaining a video clip 244 at the first encampment 225 via a camera and microphone.

133. The method of any of the above clauses wherein the first task 553A implements a data acquisition protocol 585E that comprises a data capture protocol 585H that includes obtaining a video clip 244 pertaining to the first encampment 225 via a camera and microphone.

134. The method of any of the above clauses wherein the first task 553A implements a data acquisition protocol 585E that comprises a data capture protocol 585H that includes obtaining an audio or video clip 244 pertaining to the first encampment 225 and depicting an interview or other interaction between the first client 110 and an influencer 668.

135. The method of any of the above clauses wherein the first task 553A implements a data acquisition protocol 585E that comprises a data capture protocol 585H that includes obtaining an audio or video clip 244 pertaining to the first encampment 225 and depicting an influencer 668 (e.g. a celebrity, news crew, musician, community leader, or other prominent entity whose presence or attention fosters visibility, understanding, volunteerism, or other expanded sponsorship) describing needs 559 pertaining to the first encampment 225 (e.g. among those taking shelter in the encampment or among neighbors threatened or harmed by the encampment 225).

136. The method of any of the above clauses wherein the first task 553A implements a data acquisition protocol 585E that comprises a data capture protocol 585H that includes obtaining an audio or video clip 244 pertaining to the first encampment 225 and depicting an influencer 668 describing development 400 of the first encampment 225.

137. The method of any of the above clauses wherein the first task 553A implements a data acquisition protocol 585E that comprises a data capture protocol 585H that includes obtaining an audio or video clip 244 pertaining to the first encampment 225 and depicting an influencer 668 describing development 400 of one or more clients 110 associated with the first encampment 225 (e.g. a family of which at least one member has taken shelter in the first encampment 225).

138. The method of any of the above clauses wherein client(s) 110 thereof "pertain" to the first encampment 225 by (virtue of) having recently taken shelter in the first encampment 225 (e.g. within 2-4 days prior).

139. The method of any of the above clauses wherein client(s) 110 thereof "pertain" to the first encampment 225 (at least) by being in a vicinity 100 of the first encampment 225.

140. The method of any of the above clauses wherein the one or more resources 168 "pertain" to the first encampment 225 by being in a vicinity 100 of the first encampment 225.

141. The method of any of the above clauses wherein the one or more identifiers 328 of the second resource 168C-D pertaining to the first encampment 225 is thereby transmitted via presentation hardware 712 in a vicinity 100 of the first encampment 225.

142. The method of any of the above clauses wherein the one or more identifiers 328 of the second resource 168C-D pertaining to the first encampment 225 are thereby transmitted automatically via a display screen (within or otherwise) in a vicinity 100 of the first encampment 225.

143. The method of any of the above clauses wherein the one or more identifiers 328 of the second resource 168C-D pertaining to the first encampment 225 are thereby transmitted automatically via one or more speakers in a vicinity 100 of the first encampment 225.

144. The method of any of the above clauses wherein the one or more identifiers 328 of the second resource 168C-D pertaining to the first encampment 225 are thereby transmitted to a first client 110A who has recently taken shelter in the first encampment 225.

145. The method of any of the above clauses wherein the second resource 168C-D pertaining to the first encampment 225 comprises a particular individual (e.g. resource 168D shown in FIG. 6) and wherein the one or more identifiers 328 of the second resource 168C-D comprise a name of the particular individual.

146. The method of any of the above clauses wherein the second resource 168C-D pertaining to the first encampment 225 comprises a particular dispensary (e.g. resource 168C shown in FIG. 6) and wherein the one or more identifiers 328 of the second resource 168C-D comprise a name of the particular dispensary.

147. The method of any of the above clauses wherein the second resource 168C-D pertaining to the first encampment 225 is identified with a particular location 465 (e.g. a street address or intersection) transmitted as one of the one or more identifiers 328.

148. The method of any of the above clauses wherein at least one identifier of the second resource 168C-D pertaining to the first encampment 225 is thereby transmitted to the first resource 168A-B as a primary recipient.

149. The method of any of the above clauses wherein at least one identifier of the second resource 168C-D pertaining to the first encampment 225 is thereby transmitted to the first client 110A as a primary recipient.

150. The method of any of the above clauses wherein at least one identifier of the second resource 168C-D pertaining to the first encampment 225 is thereby transmitted to the first resource 168A-B and wherein the first resource 168A-B thereafter relays the at least one identifier of the second resource 168C-D (at least) to the first client 110A as a referral.

151. The method of any of the above clauses wherein at least one identifier of the second resource 168C-D pertaining to the first encampment 225 is thereby transmitted to a computing device 700 identified with the first client 110A as a primary recipient.

152. The method of any of the above clauses wherein a referral protocol 585 pertaining to the second resource 168 comprises providing a shelter identifier 328.

153. The method of any of the above clauses wherein a monitoring protocol 585 pertaining to the second resource 168 comprises implementing a health tracking protocol 585 pertaining to one or more clients 110 within or otherwise associated with the first encampment 110.

154. The method of any of the above clauses wherein a referral protocol 585 pertaining to the second resource 168 comprises a geographic navigation protocol 585.

155. The method of any of the above clauses wherein a client intake protocol 585 pertaining to a first client 110 includes an automatic facial recognition protocol 585.

156. The method of any of the above clauses wherein a state assessment protocol 585 pertaining to a vicinity 100 of the first encampment 225 includes an image analysis protocol 585.

157. The method of any of the above clauses wherein a state assessment protocol 585 pertaining to a vicinity 100 of the first encampment 225 includes a location-based service implementation protocol 585.

158. The method of any of the above clauses wherein a state assessment protocol 585 pertaining to a vicinity 100 of the first encampment 225 includes a geofence configuration protocol 585.

159. The method of any of the above clauses wherein a state assessment protocol 585 pertaining to a first client 110 associated with the first encampment 225 includes an image analysis protocol 585.

160. The method of any of the above clauses wherein the first and second resources 168 each comprise a respective human being.

161. The method of any of the above clauses wherein an expression 306 of additional recommendation data 319 is provided to the client 110 via a special-purpose coupon as a tangible human-readable medium 330.

162. The method of any of the above clauses wherein an expression 306 of additional recommendation data 319 is provided to the client 110 with a label thereon that individually identifies the client 110 (e.g. a personalized card).

163. The method of any of the above clauses wherein an expression 306 of (at least some) additional recommendation data 319 is provided to the client 110 with a label thereon that individually identifies the client 110 with a photograph of the client 110 (e.g. an identification card).

164. The method of any of the above clauses wherein an expression 306 of additional recommendation data 319 of a locally limited material resource 541 is selectively provided to the client 110 (e.g. only when authorized via the additional recommendation data 319 and while a local supply of the material resource 541 lasts).

165. The method of any of the above clauses wherein an expression 306 of additional recommendation data 319 pertains to an inventoried material resource 541 that is selectively provided to the client 110 (e.g. only when authorized via the additional recommendation data 319 and accompanied by an indication 545 of an inventory reduction of the material resource 541).

166. The method of any of the above clauses wherein an expression 306 of (at least some) additional recommendation data 319 is provided to the client 110 via a special-purpose voucher as a tangible human-readable medium 330.

167. The method of any of the above clauses wherein an expression 306 of additional recommendation data 319 is provided to the client 110 via a magnetically recorded medium (e.g. on a special-purpose debit card) as a dispensation medium 330.

168. The method of any of the above clauses wherein an expression 306 of additional recommendation data 319 is provided to the client 110 as a single-use material resource 541 (e.g. a comestible or medication) as a dispensation medium 330.

169. The method of any of the above clauses wherein an expression 306 of (at least some) additional recommendation data 319 is provided to the client 110 as a reusable material resource 541 (e.g. clothing or tools) as a delivery medium 330.

170. The method of any of the above clauses wherein an expression 306 of additional recommendation data 319 is provided to the client 110 via a human-readable printout as a delivery medium 330.

171. The method of any of the above clauses wherein an expression 306 of additional recommendation data 319 is provided to the client 110 at an interaction location 465 in an unofficial natural language (i.e. not being an official language of the interaction location 465) via a human-readable printout as a delivery medium 330.

172. The method of any of the above clauses wherein the client 110 is not fluent in any local official language and wherein an expression 306 of (at least some) additional recommendation data 319 is provided to the client 110 in an unofficial natural language via a human-readable printout as a delivery medium 330.

173. The method of any of the above clauses wherein an expression 306 of additional recommendation data 319 is provided to the client 110 in an unofficial natural language via a human-readable printout as a delivery medium 330 as an automatic and conditional response 360 to a selection 945 or other indication 545 that one or more other clients 110 in a vicinity 100 thereof are fluent in the unofficial natural language.

174. The method of any of the above clauses wherein an expression 306 of additional recommendation data 319 is provided to the client 110 at an interaction location 465 after a machine translation thereof to an unofficial natural language (i.e. not being an official language of the interaction location 465) via a human-readable printout as a human-readable medium 330.

175. The method of any of the above clauses wherein an expression 306 of additional recommendation data 319 is sent to the first computing device 700 and describes at least a location 465 of one or more other resources 168C-D.

176. The method of any of the above clauses wherein an expression 306 of additional recommendation data 319 is sent to a second computing device 700 used by the client 110 and describes at least a location 465 of one or more other resources 168C-D.

177. The method of any of the above clauses wherein at least the first task 553A occurs while the first computing device 700 is affected with a partial or other wireless connectivity impairment 303 and wherein an expression 306 of additional recommendation data 319 in response 360 to the second feature 307A of the first encampment 225 arrives via the first computing device 700 in response 360 to the wireless connectivity impairment 303 at the first computing device 700 ending (i.e. when wireless connectivity is restored).

178. The method of any of the above clauses wherein at least the first task 553A occurs while the first computing device 700 is affected with a partial or other wireless connectivity impairment 303 and wherein an expression 306 of additional recommendation data 319 in response 360 to the second feature 307A of the first encampment 225 arrives via the first computing device 700 and pertains to the vicinity 100 of the first location 465 associated with the first qualified task 553 after the wireless connectivity impairment 303 (experienced by the first computing device) ends.

179. The method of any of the above clauses wherein the first computing device 700 is affected by a partial or other wireless connectivity impairment 303 when the first task 553A occurs and wherein the client 110 receives an expression 306 of additional recommendation data 319 that describes the wireless connectivity impairment 303 ends after the wireless linkage 229 to the first computing device 700 is restored.

180. A system 200, 300 configured to perform any of the above-described methods.

181. A system 200, 300 configured to perform or otherwise facilitate most or all operations of flow 1000 for managing at least a first encampment 225.

182. A system 200, 300 configured to perform or otherwise facilitate most or all operations of data flow 900 for managing at least a first encampment 225.

183. A system as described above comprising:

transistor-based circuitry (e.g. one or more download modules 202) causing a first computing device 700 to be configured according to one or more special-purpose protocols 585A-H by which a first task 553A pertaining to the first encampment 225 is associated with a first resource 168A-B wherein the first task 553A comprises (obtaining) one or more (current or other) features 307 of the first encampment 225 including a first feature 307A obtained (as a result of one or more actions/services provided) by the first resource 168A-B; and transistor-based circuitry (e.g. one or more interface modules 206) configured to transmit one or more identifiers 328 of at least a second resource 168C-D pertaining to the first encampment 225 wherein one or more features 307 of the first encampment 225 are correlated with the first recommendation 919A and wherein first recommendation 919A includes the one or more identifiers 328 of at least the second resource 168C-D pertaining to the first encampment 225.

184. A system as described above comprising:

transistor-based circuitry (e.g. one or more download modules 202) causing a first computing device 700 to be configured according to one or more special-purpose protocols 585A-H by which a first task 553A pertaining to the first encampment 225 is associated with a first resource 168A-B wherein the first task 553A includes obtaining a first informational component 309 pertaining to a first feature 307A of the first encampment 225 and wherein the first feature 307A has been prioritized over other features 307 of the first encampment 225 as first recommendation 919A; and transistor-based circuitry (e.g. one or more interface modules 206) configured to transmit one or more identifiers 328 of at least a second resource 168C-D pertaining to the first encampment 225 wherein one or more features 307 of the first encampment 225 are correlated with the first recommendation 919A and wherein the first recommendation 919A includes the one or more identifiers 328 of at least the second resource 168C-D pertaining to the first encampment 225.

185. A system as described above wherein (at least two of) the recited instances of transistor-based circuitry are geographically remote from one another (i.e. more than 1 kilometer apart).

186. A system as described above wherein most or all of the recited instances of transistor-based circuitry reside within a single device (e.g. an ASIC).

187. A system as described above including a control module 201 that comprises: transistor-based circuitry 230 configured to perform an instance of one or more other modules identified herein by delegation (e.g. by triggering one or more functions thereof to be performed abroad or in one or more cloud servers 800).

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other such transitive, relational, or other connections do not generally exclude such variants, unless context dictates otherwise.

What is claimed is:

1. A data-driven therapeutic method for managing at least a first encampment of individuals comprising:

invoking first circuitry configured to cause a first computing device to be configured according to one or more special-purpose protocols by which a first recommendation is obtained that comprises a first resource selectively performing a first task that comprises obtaining one or more primary informational components pertaining to said first encampment wherein said one or more primary informational components have a higher prioritization than that of at least one secondary informational component;

wherein transmission of a first feature from said first computing device and a diagnostic protocol by which said first recommendation is correlated with said one or more features of said first encampment are both delayed by a first wireless connectivity impairment affecting a wireless linkage to said first computing device; and wherein an expression of said first recommendation that arrives at said first computing device following said first wireless connectivity impairment indicates that said first recommendation can be acted upon right away; and automatically invoking second circuitry configured to indicate a first subsequent interactive event at least between a second resource and said first encampment partly based on a first correlation between said second resource and a first informational component of said one or more primary informational components and partly based on one or more success-indicative scoring functions having been used by one or more machine learning modules wherein said first task implements a data acquisition protocol that comprises:

implementing a scoring protocol that includes obtaining one or more images or other content portraying a current state of said first encampment;

allowing at least some of one or more clips to be published online as said informational component; and implementing a decision protocol that prioritizes a subsequent interactive event as a second task according to how many quantified-endorsement-related indications are associated with said first online content by one or more software implementations.

2. A non-transitory computer program product comprising:

one or more tangible, nonvolatile storage media; and machine instructions borne on said one or more tangible, nonvolatile storage media which, when running on one or more computer systems, cause said one or more computer systems to perform said method of claim 1.

3. A data-driven therapeutic method for managing at least a first encampment of individuals comprising:

invoking first circuitry configured to cause a first computing device to be configured according to one or more special-purpose protocols by which a first recommendation is obtained that comprises a first resource selectively performing a first task that comprises obtaining one or more primary informational components pertaining to said first encampment wherein said one or more primary informational components have a higher prioritization than that of at least one secondary informational component;

wherein transmission of a first feature from said first computing device and a diagnostic protocol by which said first recommendation is correlated with said one or more features of said first encampment are both delayed by a first wireless connectivity impairment affecting a wireless linkage to said first computing device; and wherein an expression of said first recommendation that arrives at said first computing device following said first wireless connectivity impairment indicates that said first recommendation can be acted upon right away; and automatically invoking second circuitry configured to indicate a first subsequent interactive event at least between a second resource and said first encampment partly based on a first correlation between said second resource and a first informational component of said one or more primary informational components and partly based on one or more success-indicative scoring functions having been used by one or more machine learning modules wherein said first task includes a first informational component provided by said one or more machine learning modules configured to generate first recommendation data based on a content-success-indicative performance metric pertaining to photographic content depicting a development associated with one or more objects in said first encampment and wherein signaling said first interactive event comprises signaling a capture of one or more images of one or more inanimate objects used by at least one human client for shelter as a component of said first interactive event.

4. A non-transitory computer program product comprising:

one or more tangible, nonvolatile storage media; and machine instructions borne on said one or more tangible, nonvolatile storage media which, when running on one or more computer systems, cause said one or more computer systems to perform said method of claim 3.

5. A data-driven therapeutic method for managing at least a first encampment of individuals comprising:

invoking first circuitry configured to cause a first computing device to be configured according to one or more special-purpose protocols by which a first recommendation is obtained that comprises a first resource selectively performing a first task that comprises obtaining one or more primary informational components pertaining to said first encampment wherein said one or more primary informational components have a higher prioritization than that of at least one secondary informational component;

wherein transmission of a first feature from said first computing device and a diagnostic protocol by which said first recommendation is correlated with said one or more features of said first encampment are both delayed by a first wireless connectivity impairment affecting a wireless linkage to said first computing device; and wherein an expression of said first recommendation that arrives at said first computing device following said first wireless connectivity impairment indicates that said first recommendation can be acted upon right away; and automatically invoking second circuitry configured to indicate a first subsequent interactive event at least between a second resource and said first encampment partly based on a first correlation between said second resource and a first informational component of said one or more primary informational components and partly based on one or more success-indicative scoring functions having been used by one or more machine learning modules wherein said one or more primary informational components previously obtained said higher prioritization thereof based on said one or more primary informational components having been recommended by an expert system, neural network, or other computing resource and wherein said expression of said first recommendation that arrives at said first computing device following said first wireless connectivity impairment indicates that said first recommendation should be acted upon right away.

6. A non-transitory computer program product comprising:

one or more tangible, nonvolatile storage media; and machine instructions borne on said one or more tangible, nonvolatile storage media which, when running on one or more computer systems, cause said one or more computer systems to perform said method of claim 5.

7. A data-driven therapeutic method for managing at least a first encampment of individuals comprising:

invoking first circuitry configured to cause a first computing device to be configured according to one or more special-purpose protocols by which a first recommendation is obtained that comprises a first resource selectively performing a first task that comprises obtaining one or more primary informational components pertaining to said first encampment wherein said one or more primary informational components have a higher prioritization than that of at least one secondary informational component;

wherein transmission of a first feature from said first computing device and a diagnostic protocol by which said first recommendation is correlated with said one or more features of said first encampment are both delayed by a first wireless connectivity impairment affecting a wireless linkage to said first computing device; and wherein an expression of said first recommendation that arrives at said first computing device following said first wireless connectivity impairment indicates that said first recommendation can be acted upon right away; and defining a first subsequent interactive event selectively at least among a second resource, a client associated with said first encampment, and specific hardware deemed necessary to implement one or more protocols at said first subsequent interactive event; and automatically invoking second circuitry configured to indicate said first subsequent interactive event at least between said second resource and said first encampment partly based on a first correlation between said second resource and a first informational component of said one or more primary informational components and partly based on one or more success-indicative scoring functions having been used by one or more machine learning modules.

8. A non-transitory computer program product comprising:

one or more tangible, nonvolatile storage media; and machine instructions borne on said one or more tangible, nonvolatile storage media which, when running on one or more computer systems, cause said one or more computer systems to perform said method of claim 7.

9. A data-driven therapeutic method for managing at least a first encampment of individuals comprising:

invoking first circuitry configured to cause a first computing device to be configured according to one or more special-purpose protocols by which a first recommendation is obtained that comprises a first resource selectively performing a first task that comprises obtaining one or more primary informational components pertaining to said first encampment wherein said one or more primary informational components have a higher prioritization than that of at least one secondary informational component;
  wherein transmission of a first feature from said first computing device and a diagnostic protocol by which said first recommendation is correlated with said one or more features of said first encampment are both delayed by a first wireless connectivity impairment affecting a wireless linkage to said first computing device; and
  wherein an expression of said first recommendation that arrives at said first computing device following said first wireless connectivity impairment indicates that said first recommendation can be acted upon right away; and
automatically invoking second circuitry configured to indicate a first subsequent interactive event at least between a second resource and said first encampment partly based on a first correlation between said second resource and a first informational component of said one or more primary informational components and partly based on one or more success-indicative scoring functions having been used by one or more machine learning modules wherein said first feature has been prioritized over other features of said first encampment as first recommendation partly based on one or more content-success-indicative scoring functions and partly based on one or more client-success-indicative scoring functions.

10. A non-transitory computer program product comprising:
one or more tangible, nonvolatile storage media; and
machine instructions borne on said one or more tangible, nonvolatile storage media which, when running on one or more computer systems, cause said one or more computer systems to perform said method of claim 9.

11. A data-driven therapeutic method for managing at least a first encampment of individuals comprising:
invoking first circuitry configured to cause a first computing device to be configured according to one or more special-purpose protocols by which a first recommendation is obtained that comprises a first resource selectively performing a first task that comprises obtaining one or more primary informational components pertaining to said first encampment wherein said one or more primary informational components have a higher prioritization than that of at least one secondary informational component;
  wherein transmission of a first feature from said first computing device and a diagnostic protocol by which said first recommendation is correlated with said one or more features of said first encampment are both delayed by a first wireless connectivity impairment affecting a wireless linkage to said first computing device; and
  wherein an expression of said first recommendation that arrives at said first computing device following said first wireless connectivity impairment indicates that said first recommendation can be acted upon right away; and
automatically invoking second circuitry configured to indicate a first subsequent interactive event at least between a second resource and said first encampment partly based on a first correlation between said second resource and a first informational component of said one or more primary informational components and partly based on one or more success-indicative scoring functions having been used by one or more machine learning modules wherein said second resource has been selected by said one or more machine learning modules as an additional recommendation partly based on said first feature of said first encampment and partly based on a second feature of said first encampment both obtained via said one or more special-purpose protocols and wherein said second feature comprises a type identifier of said first encampment.

12. A non-transitory computer program product comprising:
one or more tangible, nonvolatile storage media; and
machine instructions borne on said one or more tangible, nonvolatile storage media which, when running on one or more computer systems, cause said one or more computer systems to perform said method of claim 11.

13. A data-driven therapeutic method for managing at least a first encampment of individuals comprising:
invoking first circuitry configured to cause a first computing device to be configured according to one or more special-purpose protocols by which a first recommendation is obtained that comprises a first resource selectively performing a first task that comprises obtaining one or more primary informational components pertaining to said first encampment wherein said one or more primary informational components have a higher prioritization than that of at least one secondary informational component;
  wherein transmission of a first feature from said first computing device and a diagnostic protocol by which said first recommendation is correlated with said one or more features of said first encampment are both delayed by a first wireless connectivity impairment affecting a wireless linkage to said first computing device; and
  wherein an expression of said first recommendation that arrives at said first computing device following said first wireless connectivity impairment indicates that said first recommendation can be acted upon right away; and
automatically invoking second circuitry configured to indicate a first subsequent interactive event at least between a second resource and said first encampment partly based on a first correlation between said second resource and a first informational component of said one or more primary informational components and partly based on one or more success-indicative scoring functions having been used by one or more machine learning modules wherein said one or more machine learning modules are configured to generate said first recommendation data partly based on said one or more success-indicative scoring functions and partly based on training data pertaining to one or more other encampments.

14. A non-transitory computer program product comprising:
one or more tangible, nonvolatile storage media; and
machine instructions borne on said one or more tangible, nonvolatile storage media which, when running on one or more computer systems, cause said one or more computer systems to perform said method of claim 13.

15. A data-driven therapeutic method for managing at least a first encampment of individuals comprising:
  invoking first circuitry configured to cause a first computing device to be configured according to one or more special-purpose protocols by which a first recommendation is obtained that comprises a first resource selectively performing a first task that comprises obtaining one or more primary informational components pertaining to said first encampment wherein said one or more primary informational components have a higher prioritization than that of at least one secondary informational component;
    wherein transmission of a first feature from said first computing device and a diagnostic protocol by which said first recommendation is correlated with said one or more features of said first encampment are both delayed by a first wireless connectivity impairment affecting a wireless linkage to said first computing device; and
    wherein an expression of said first recommendation that arrives at said first computing device following said first wireless connectivity impairment indicates that said first recommendation can be acted upon right away; and
  automatically invoking second circuitry configured to indicate a first subsequent interactive event at least between a second resource and said first encampment partly based on a first correlation between said second resource and a first informational component of said one or more primary informational components and partly based on one or more success-indicative scoring functions having been used by one or more machine learning modules wherein said second resource has been identified by said one or more machine learning modules as a second recommendation data based on said second feature of said first encampment and wherein said second feature pertains to said first encampment by virtue of pertaining to one or more at-risk clients who have recently taken shelter in said first encampment.

16. A non-transitory computer program product comprising:
  one or more tangible, nonvolatile storage media; and
  machine instructions borne on said one or more tangible, nonvolatile storage media which, when running on one or more computer systems, cause said one or more computer systems to perform said method of claim 15.

17. A data-driven therapeutic method for managing at least a first encampment of individuals comprising:
  invoking first circuitry configured to cause a first computing device to be configured according to one or more special-purpose protocols by which a first recommendation is obtained that comprises a first resource selectively performing a first task that comprises obtaining one or more primary informational components pertaining to said first encampment wherein said one or more primary informational components have a higher prioritization than that of at least one secondary informational component;
    wherein transmission of a first feature from said first computing device and a diagnostic protocol by which said first recommendation is correlated with said one or more features of said first encampment are both delayed by a first wireless connectivity impairment affecting a wireless linkage to said first computing device; and
    wherein an expression of said first recommendation that arrives at said first computing device following said first wireless connectivity impairment indicates that said first recommendation can be acted upon right away; and
  automatically invoking second circuitry configured to indicate a first subsequent interactive event at least between a second resource and said first encampment partly based on a first correlation between said second resource and a first informational component of said one or more primary informational components and partly based on one or more success-indicative scoring functions having been used by one or more machine learning modules wherein said second feature comprises a count of one or more physical objects that characterize a state of said first encampment and wherein said second resource has been identified as a second recommendation data partly based on said one or more success-indicative scoring functions and partly based on said second feature of said first encampment.

18. A non-transitory computer program product comprising:
  one or more tangible, nonvolatile storage media; and
  machine instructions borne on said one or more tangible, nonvolatile storage media which, when running on one or more computer systems, cause said one or more computer systems to perform said method of claim 17.

19. A data-driven therapeutic method for managing at least a first encampment of individuals comprising:
  invoking first circuitry configured to cause a first computing device to be configured according to one or more special-purpose protocols by which a first recommendation is obtained that comprises a first resource selectively performing a first task that comprises obtaining one or more primary informational components pertaining to said first encampment wherein said one or more primary informational components have a higher prioritization than that of at least one secondary informational component;
    wherein transmission of a first feature from said first computing device and a diagnostic protocol by which said first recommendation is correlated with said one or more features of said first encampment are both delayed by a first wireless connectivity impairment affecting a wireless linkage to said first computing device; and
    wherein an expression of said first recommendation that arrives at said first computing device following said first wireless connectivity impairment indicates that said first recommendation can be acted upon right away; and
  automatically invoking second circuitry configured to indicate a first subsequent interactive event at least between a second resource and said first encampment partly based on a first correlation between said second resource and a first informational component of said one or more primary informational components and partly based on one or more success-indicative scoring functions having been used by one or more machine learning modules wherein a first expression of said second recommendation data pertains to an inventoried material resource that is selectively provided to an at-risk client, and physically handed to said client right away after being identified and wherein said one or more success-indicative scoring functions include at least one client-success-indicative scoring function.

20. A non-transitory computer program product comprising:
one or more tangible, nonvolatile storage media; and
machine instructions borne on said one or more tangible, nonvolatile storage media which, when running on one or more computer systems, cause said one or more computer systems to perform said method of claim 19.

21. A data-driven therapeutic method for managing at least a first encampment of individuals comprising:
invoking first circuitry configured to cause a first computing device to be configured according to one or more special-purpose protocols by which a first recommendation is obtained that comprises a first resource selectively performing a first task that comprises obtaining one or more primary informational components pertaining to said first encampment wherein said one or more primary informational components have a higher prioritization than that of at least one secondary informational component;
wherein transmission of a first feature from said first computing device and a diagnostic protocol by which said first recommendation is correlated with said one or more features of said first encampment are both delayed by a first wireless connectivity impairment affecting a wireless linkage to said first computing device; and
wherein an expression of said first recommendation that arrives at said first computing device following said first wireless connectivity impairment indicates that said first recommendation can be acted upon right away; and
automatically invoking second circuitry configured to indicate a first subsequent interactive event at least between a second resource and said first encampment partly based on a first correlation between said second resource and a first informational component of said one or more primary informational components and partly based on one or more success-indicative scoring functions having been used by one or more machine learning modules wherein said first task implements a data acquisition protocol that comprises a site monitoring protocol by which one or more scalar measurements indicative of situational development pertaining to one or more states of a location in or near said first encampment are obtained and wherein a tangible expression of additional recommendation data is physically provided to a human client right away after being identified to said first resource.

22. A non-transitory computer program product comprising:
one or more tangible, nonvolatile storage media; and
machine instructions borne on said one or more tangible, nonvolatile storage media which, when running on one or more computer systems, cause said one or more computer systems to perform said method of claim 21.

23. A data-driven therapeutic method for managing at least a first encampment of individuals comprising:
invoking first circuitry configured to cause a first computing device to be configured according to one or more special-purpose protocols by which a first recommendation is obtained that comprises a first resource selectively performing a first task that comprises obtaining one or more primary informational components pertaining to said first encampment wherein said one or more primary informational components have a higher prioritization than that of at least one secondary informational component;
wherein transmission of a first feature from said first computing device and a diagnostic protocol by which said first recommendation is correlated with said one or more features of said first encampment are both delayed by a first wireless connectivity impairment affecting a wireless linkage to said first computing device; and
wherein an expression of said first recommendation that arrives at said first computing device following said first wireless connectivity impairment indicates that said first recommendation can be acted upon right away; and
automatically invoking second circuitry configured to indicate a first subsequent interactive event at least between a second resource and said first encampment partly based on a first correlation between said second resource and a first informational component of said one or more primary informational components and partly based on one or more success-indicative scoring functions having been used by one or more machine learning modules wherein said first task implements a data acquisition protocol that comprises a client intake protocol, wherein at least one identifier of said second resource pertaining to said first encampment is thereby transmitted to said first resource, and wherein said first resource thereby relays said at least one identifier of said second resource during a second wireless connectivity impairment to said first client as a referral.

24. A non-transitory computer program product comprising:
one or more tangible, nonvolatile storage media; and
machine instructions borne on said one or more tangible, nonvolatile storage media which, when running on one or more computer systems, cause said one or more computer systems to perform said method of claim 23.

\* \* \* \* \*